US012810415B2

(12) United States Patent
Lin

(10) Patent No.: US 12,810,415 B2
(45) Date of Patent: Nov. 24, 2026

(54) IMAGE PROCESSING METHOD AND APPARATUS, COMPUTER DEVICE, AND MEDIUM

(71) Applicant: TENCENT CLOUD COMPUTING (BEIJING) CO., LTD, Beijing (CN)

(72) Inventor: Yi Lin, Beijing (CN)

(73) Assignee: TENCENT CLOUD COMPUTING (BEIJING) CO., LTD, Beijing (CN)

( * ) Notice: Subject to any disclaimer, the term of this patent is extended or adjusted under 35 U.S.C. 154(b) by 726 days.

(21) Appl. No.: 18/123,554

(22) Filed: Mar. 20, 2023

(65) Prior Publication Data

US 2023/0230237 A1 Jul. 20, 2023

Related U.S. Application Data

(63) Continuation of application No. PCT/CN2021/108929, filed on Jul. 28, 2021.

(30) Foreign Application Priority Data

Mar. 22, 2021 (CN) ......................... 202110302731.1

(51) Int. Cl.

*G06V 10/44* (2022.01)
*G06T 3/40* (2006.01)

(Continued)

(52) U.S. Cl.

CPC .............. *G06T 7/0012* (2013.01); *G06T 3/40* (2013.01); *G06T 7/11* (2017.01); *G06V 10/25* (2022.01);

(Continued)

(58) Field of Classification Search

CPC . G06T 7/0012; G06T 3/40; G06T 7/11; G06T 2207/30012; G06T 2207/10116;

(Continued)

(56) References Cited

FOREIGN PATENT DOCUMENTS

| | | |
|---|---|---|
| CN | 108427963 A | 8/2018 |
| CN | 109493350 A | 3/2019 |
| CN | 111415358 A | 7/2020 |

OTHER PUBLICATIONS

Lin, Yi, et al. "Seg4Reg networks for automated spinal curvature estimation." International workshop and challenge on computational methods and clinical applications for spine imaging. Cham: Springer International Publishing, 2019. (Year: 2019).*

(Continued)

*Primary Examiner* — Amandeep Saini
*Assistant Examiner* — Denise G Alfonso
(74) *Attorney, Agent, or Firm* — ArentFox Schiff LLP

(57) ABSTRACT

An image processing method is provided. An image including a target object is obtained. Image segmentation is performed on the image. A mask image of the target object is determined based on the image segmentation performed on the image. A first feature extraction is performed on the image. A first predicted value associated with the target object is determined based on a first feature extraction result of the first feature extraction performed on the image. A second feature extraction is performed on the mask image. A second predicted value associated with the target object is determined based on a second feature extraction result of the second feature extraction performed on the mask image. A target predicted value associated with the target object is determined according to the first predicted value and the second predicted value.

17 Claims, 10 Drawing Sheets

(51) Int. Cl.

*G06T 7/00* (2017.01)
*G06T 7/11* (2017.01)
*G06V 10/25* (2022.01)
*G06V 10/764* (2022.01)
*G06V 10/771* (2022.01)
*G06V 20/70* (2022.01)

(52) U.S. Cl.

CPC ............ *G06V 10/44* (2022.01); *G06V 10/764* (2022.01); *G06V 10/771* (2022.01); *G06V 20/70* (2022.01); *G06T 2207/30012* (2013.01)

(58) Field of Classification Search

CPC . G06T 2207/10132; G06T 2207/20081; G06T 2207/20084; G06V 10/25; G06V 10/44; G06V 10/764; G06V 10/771; G06V 20/70; G06V 2201/03; G06V 10/26; G06V 10/82

See application file for complete search history.

(56) References Cited

OTHER PUBLICATIONS

Qin, Chunli, et al. "Residual block-based multi-label classification and localization network with integral regression for vertebrae labeling." arXiv preprint arXiv:2001.00170 (2020). (Year: 2020).*

Lin et al., "Seg4Reg Networks for Automated Spinal Curvature Estimation", Springer Nature Switzerland AG, 2020, 2020, pp. 69-74.

Liu Wenru, "Introduction to Python Deep Learning from Zero Foundation", China Machinery Industry Press, 2020, 5 pages of Original Document only.

Office Action and Search Report received for Chinese Application No. 202110302731.1, mailed on May 23, 2025, 18 pages (10 pages of original office action and 8 pages of English Translation).

International Search Report in PCT/CN2021/108929, mailed Dec. 8, 2021, 5 pages.

Written Opinion in PCT/CN2021/108929, mailed Dec. 8, 2021, 4 pages.

* cited by examiner

| Direct regression 1101 | Segmentation 1102 | Average absolute value loss function 1103 | Area of interest enhancement 1104 | Average absolute error | Symmetric absolute error (%) |
|---|---|---|---|---|---|
| ✓ | | | | 6.34,7.77,8.01 | 12.32 |
| ✓ | ✓ | | | 6.51,6.22,7.17 | 10.95 |
| ✓ | ✓ | ✓ | | 4.03,6.38,5.80 | 9.52 |
| ✓ | ✓ | ✓ | ✓ | 4.17,6.01,4.96 | 8.77 |

IMAGE PROCESSING METHOD AND APPARATUS, COMPUTER DEVICE, AND MEDIUM

RELATED APPLICATIONS

This application is a continuation of International Application No. PCT/CN2021/108929, filed on Jul. 28, 2021, and entitled "IMAGE PROCESSING METHOD AND APPARATUS, AND COMPUTER DEVICE AND MEDIUM," which claims priority to Chinese Patent Application No. 202110302731.1, filed on Mar. 22, 2021 and entitled "IMAGE PROCESSING METHOD AND APPARATUS, COMPUTER DEVICE, AND MEDIUM.". The entire disclosures of the prior applications are hereby incorporated by reference in their entirety.

FIELD OF THE TECHNOLOGY

This disclosure relates to the field of Internet technologies, including to an image processing method and apparatus, a computer device, and a medium.

BACKGROUND OF THE DISCLOSURE

The development of artificial intelligence technology not only affects people's production and life in various application fields, but also promotes the development and progress of the world. For example, in the medical field, in recent years, scoliosis has increased year by year, which not only causes appearance deformities and psychological problems for teenagers, but also leads to a low cardiopulmonary function and intractable pain.

In the related technologies, the detection of a scoliosis situation mainly depends on X-ray films (that is, images to be processed). A related method for measuring a lateral bend angle of spine includes: an examiner performing measurement on a full-length X-ray film of the spine manually by using a pencil and a protractor. Moreover, in the method, clinical experience is usually relied on to find upper and lower vertebrae having the largest inclination, to draw an extension line of a vertebral endplate and then a vertical line, and to perform measurement by using a protractor; a measured angle is the lateral bend angle.

The examination method using full-length X-ray of a spine is limited by the conditions of the X-ray device and the experience level of the medical staff. In the process of measuring the lateral bend angle, the difference in manual measurement is not eliminated, and the accuracy is relatively poor.

SUMMARY

Embodiments of this disclosure include an image processing method and apparatus, a computer device, and a medium, which can increase the accuracy of a target predicted value in combination with an image segmentation technology.

In an aspect, an image processing method is provided. In the image processing method, an image including a target object is obtained. Image segmentation is performed on the image. A mask image of the target object is determined based on the image segmentation performed on the image. A first feature extraction is performed on the image. A first predicted value associated with the target object is determined based on a first feature extraction result of the first feature extraction performed on the image. A second feature extraction is performed on the mask image. A second predicted value associated with the target object is determined based on a second feature extraction result of the second feature extraction performed on the mask image. A target predicted value associated with the target object is determined according to the first predicted value and the second predicted value.

In another aspect, an image processing apparatus including processing circuitry is provided. The processing circuitry is configured to obtain an image including a target object. The processing circuitry is configured to perform image segmentation on the image. The processing circuitry is configured to determine a mask image of the target object based on the image segmentation performed on the image. The processing circuitry is configured to perform a first feature extraction on the image, and determine a first predicted value associated with the target object based on a first feature extraction result of the first feature extraction performed on the image. The processing circuitry is configured to perform a second feature extraction on the mask image, and determine a second predicted value associated with the target object based on a second feature extraction result of the second feature extraction performed on the mask image. The processing circuitry is configured to determine a target predicted value associated with the target object according to the first predicted value and the second predicted value In another aspect, another image processing method is provided. In the image processing method, an image processing model including a segmentation network and a regression network is obtained. The regression network includes a first branch network and a second branch network. A first sample image including a target object and a target label of the first sample image is obtained. The target label indicates a target mark value associated with the target object. Image segmentation is performed on the first sample image through a segmentation network, and a first sample mask image of the target object is determined based on the image segmentation performed on the first sample image. A network parameter of the segmentation network is updated based on the first sample mask image, and the segmentation network is iteratively trained according to the updated network parameter of the segmentation network, to obtain a target segmentation network. A first feature extraction is performed on the first sample image, via the first branch network, to determine a first sample predicted value associated with the target object. A second feature extraction is performed on the first sample mask image, via the second branch network, to determine a second sample predicted value associated with the target object. A target sample predicted value associated with the target object is determined based on the first sample predicted value and the second sample predicted value. A network parameter of the regression network is updated according to the target sample predicted value and the target mark value, and the regression network is iteratively trained according to the updated network parameter of the regression network, to obtain a target regression network. A target image processing model is obtained through the target segmentation network and the target regression network. The target image processing model is configured to perform data analysis on an image including the target object, to obtain a target predicted value associated with the target object.

In another aspect, the embodiments of this disclosure provide another image processing apparatus that includes processing circuitry. The processing circuitry is configured to obtain an image processing model including a segmentation network and a regression network. The regression network includes a first branch network and a second branch network. The processing circuitry is configured to obtain a first sample image including a target object and a target label of the first sample image. The target label indicates a target mark value associated with the target object. The processing circuitry is configured to perform image segmentation on the first sample image through a segmentation network, and determine a first sample mask image of the target object based on the image segmentation performed on the first sample image. The processing circuitry is configured to update a network parameter of the segmentation network based on the first sample mask image, and iteratively train the segmentation network according to the updated network parameter of the segmentation network, to obtain a target segmentation network. The processing circuitry is configured to perform a first feature extraction on the first sample image, via the first branch network, to determine a first sample predicted value associated with the target object. The processing circuitry is configured to perform a second feature extraction on the first sample mask image, via the second branch network, to determine a second sample predicted value associated with the target object. The processing circuitry is configured to determine a target sample predicted value associated with the target object based on the first sample predicted value and the second sample predicted value. The processing circuitry is configured to update a network parameter of the regression network according to the target sample predicted value and the target mark value, and iteratively train the regression network according to the updated network parameter of the regression network, to obtain a target regression network. The processing circuitry is configured to obtain a target image processing model through the target segmentation network and the target regression network. The target image processing model is configured to perform data analysis on an image including the target object, to obtain a target predicted value associated with the target object.

Correspondingly, the embodiments of this disclosure further provide a computer device, the computer device including an output device, a processor, and a storage apparatus; the storage apparatus is configured to store program instructions; the processor is configured to call the program instructions and execute the image processing method.

Correspondingly, the embodiments of this disclosure further provide a non-transitory computer-readable storage medium storing instructions which when executed by a processor cause the processor to perform any of the image processing methods.

Correspondingly, an aspect of this disclosure provides a computer program product or a computer program, the computer program product or the computer program including computer instructions, and the computer instructions being stored in the computer-readable storage medium. A processor of the computer device reads the computer instructions from the computer-readable storage medium, and the processor executes the computer instructions, so that the computer device performs the image processing method provided above.

Technical solutions provided in the embodiments of this disclosure may include at least the following beneficial effects:

obtaining an image to be processed including a target object, performing image segmentation on the image to be processed, and determining a mask image associated with the target object. performing feature extraction on the image to be processed, determining a first predicted value associated with the target object based on a feature extraction result of the image to be processed, performing feature extraction on the mask image, determining a second predicted value associated with the target object based on a feature extraction result of the mask image, and further determining a target predicted value associated with the target object according to the first predicted value and the second predicted value. The accuracy of the target predicted value can be increased in combination with the image segmentation technology.

BRIEF DESCRIPTION OF THE DRAWINGS

To describe the technical solutions of the embodiments of this disclosure more clearly, the following briefly introduces the accompanying drawings required for describing the embodiments. The accompanying drawings in the following description show only some embodiments of this disclosure. Other embodiments are within the scope of this disclosure.

DESCRIPTION OF EMBODIMENTS

To make the objectives, technical solutions, and advantages of this disclosure clearer, the following further describes exemplary implementations of this disclosure in detail with reference to the accompanying drawings.

The solutions according to the embodiments of this disclosure relate to, for example, the machine learning technology of the artificial intelligence. A description is provided through the following embodiments.

Figure 1:
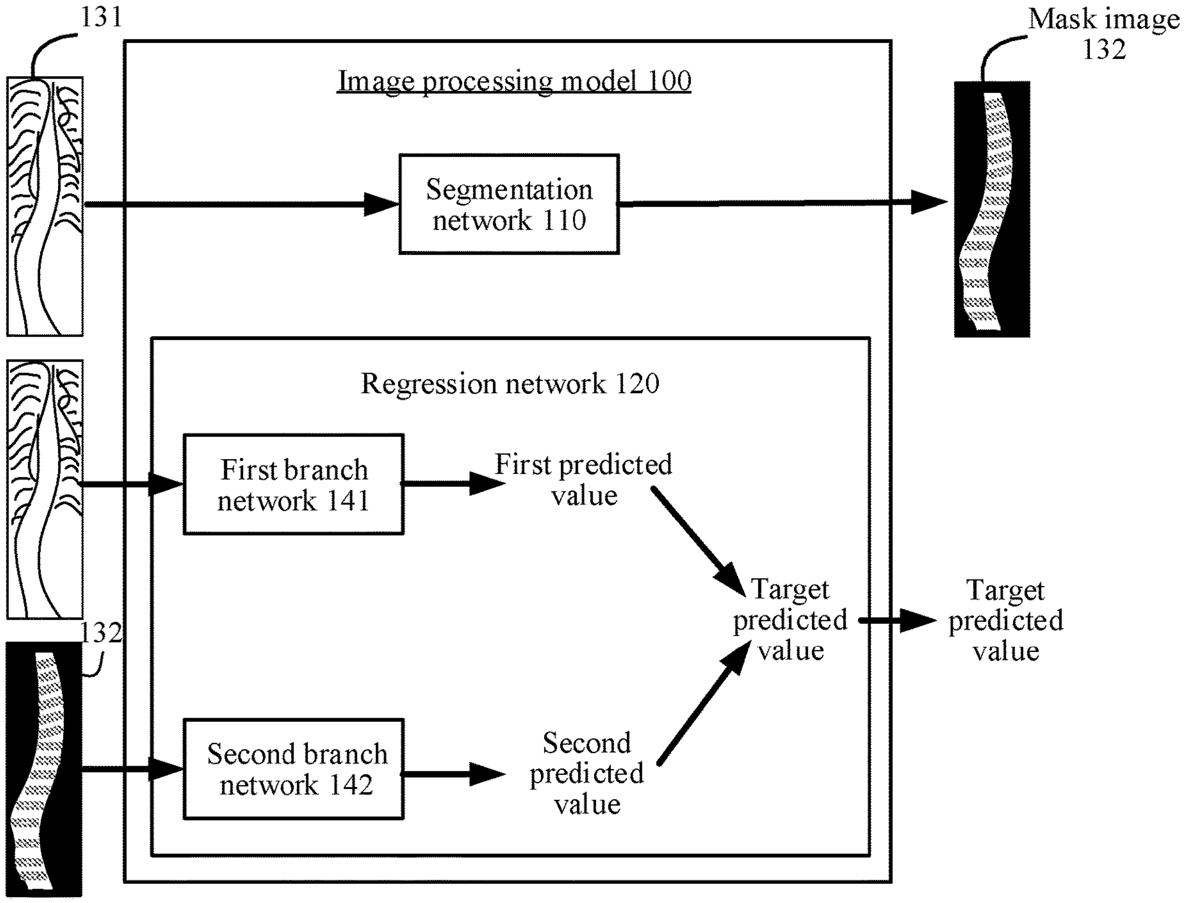
FIG. 1 is a schematic structural diagram of an image processing model according to an embodiment of this disclosure.

In an embodiment of this disclosure, an image processing model is constructed. As shown in FIG. 1, an image processing model 100 includes a segmentation network 110 and a regression network 120. The segmentation network 110 is configured to perform image segmentation on an input image 131 including a target object and determine a mask image 132 associated with the target object. The regression network 120 may be a twin neural network. The twin neural network may include two inputs (the input image 131 and a mask image 132 corresponding to the input image 131). The two inputs enter the two neural networks (a first branch network 141 and a second branch network 142), respectively. The first branch network 141 performs feature extraction on the input image 131, and determines a first predicted value associated with the target object based on a feature extraction result of the input image 131. The second branch network performs feature extraction on the mask image 132, and determines a second predicted value associated with the target object based on a feature extraction result of the mask image 132. A target predicted value associated with target object is determined according to the first predicted value and second predicted value.

The target predicted value includes a classification predicted value of the target object in the image, such as: a probability value at which the target object pertains to a particular classification; or the target predicted value includes a morphological predicted value of the target object in the image, such as: a representative angle value of the target object. The meaning of the target predicted value is not limited in this embodiment of this disclosure.

After construction of the image processing model is completed, the image processing model may be trained based on a target task associated with the target object, and subsequently, the image to be processed including the target object may be directly analyzed through the trained image processing model (hereinafter referred to as a target image processing model), to determine the target predicted value associated with the target object. In this embodiment of this disclosure, segmentation networks in the target image processing model may be collectively referred to as a target segmentation network, and regression networks in the target image processing model may be collectively referred to as a target regression network.

An exemplary implementation of training the image processing model includes: obtaining a large number of sample images including a target object and a target label of each sample image, using these sample images and the corresponding target labels as a training set, and training an image processing model by using the training set, so as to obtain the target image processing model.

The target image processing model can be applied to any prediction scenario that needs to be associated with a target object, for example, in the medical field, the biological field, and the like. For example, in the medical field, assuming that the prediction scenario is a prediction scenario of a lateral bend angle of spine, a target task of training the image processing model is: predicting a lateral bend angle of spine in a spinal scan image (hereinafter collectively referred to as a predicted lateral bend angle of spine), and in this case, the target object is the spine, the spinal scan image is a sample image, and the target label added for the sample image includes two parts of information: first, mark lateral bend angle of spine; and second, mask mark information, where the mask mark information indicates a mark classification of each pixel in a mark mask image corresponding to the sample image (or can be understood as an actual mask image), and the mark classification of each pixel in the mark mask image may include a background, a vertebra, and an intervertebral disc. Each mark classification may be indicated by a different mark value, for example, mark values corresponding to pixels of the background, the vertebra, and the intervertebral disc may be 0, 1, and 2, respectively; the mark values may be used for distinguishing classifications to which different pixels pertain. Therefore, a lateral bend angle of spine in the sample image is obtained through recognition in combination with the mark mask image and the sample image, and the image processing model is trained after comparing the lateral bend angle of spine with the mark lateral bend angle of spine.

For example, still in the medical field, the prediction scenario may alternatively be a prediction scenario of a lesion classification (for example, a thyroid lesion classification, a breast lesion classification, or the like). For example, in the prediction scenario of the thyroid lesion classification, a target task of training the image processing model is: accurately predicting a thyroid lesion classification in a thyroid image (for example, a thyroid color Doppler ultrasound image), and in this case, the target object is a thyroid, the thyroid color Doppler ultrasound image is the sample image, and the target label added for the sample image includes two parts of information: first, a lesion area; and second, a mark lesion classification corresponding to the lesion area (for example, a thyroid nodule, a thyroid tumor, a thyroid cancer, or the like).

It can be seen from the above content that, in this embodiment of this disclosure, a target image processing model applied to different prediction scenarios can be obtained by training using different types of sample images. In an embodiment, a computer device may call target image processing models applied to different prediction scenarios, that is, there may be a plurality of target image processing models. In this case, after the computer device obtains an image to be processed, the computer device may first identify an image type of the image to be processed, select from the plurality of target image processing models a target image processing model that matches the image type, and then perform data analysis on the image to be processed through the target image processing model that matches the image type, to determine a target predicted value (for example, a lateral bend angle of spine, a lesion classification result, or the like) associated with the target object.

For example, the target image processing model includes a first image processing model and a second image processing model; the first image processing model is configured to determine a lateral bend angle of spine in a spinal scan image; and the second image processing model is configured to determine a thyroid lesion area in a thyroid ultrasound image and a lesion classification corresponding to the thyroid lesion area. Image types and output results of images to be processed corresponding to the image processing models are shown in table 1. In this case, after the computer device obtains an image to be processed P1, in a case that the image type of the image to be processed P1 is identified as a spinal scan image, the first image processing model may be called to determine a lateral bend angle of spine in the spinal scan image; in a case that the image type of the image to be processed P1 is identified as a thyroid ultrasound image, the second image processing model may be called to segment a thyroid lesion area from a brain scan image and determine a lesion classification corresponding to the thyroid lesion area.

TABLE 1

| Image processing model | Image type of the image to be processed | Model output result |
|---|---|---|
| First image processing model | Spinal scan image | Lateral bend angle of spine |
| Second image processing model | Gland scan image | Thyroid lesion area and lesion classification corresponding to the thyroid lesion area |

Alternatively, in another embodiment, a computer device runs an image processing platform, for example, an application program or a web page. A user may log in to the image processing platform, upload an image to be processed including a target object, and enter processing requirement information for the image to be processed. The processing requirement information is used for indicating a target prediction item for the image to be processed. The prediction item may include a lateral bend angle of spine, a lesion classification, or the like, in which the prediction scenario, such as disease classification, may further be subdivided into a plurality of sub-classifications. For example, the lesion classification may be subdivided into a thyroid lesion classification, a breast lesion classification, and the like. The computer device may obtain the image to be processed and the processing requirement information uploaded by the user, select from the plurality of target image processing models a target image processing model that matches the processing requirement information, and perform data analysis on the image to be processed through the target image processing model that matches the processing requirement information, to determine a target predicted value associated with the target object.

Figure 2:
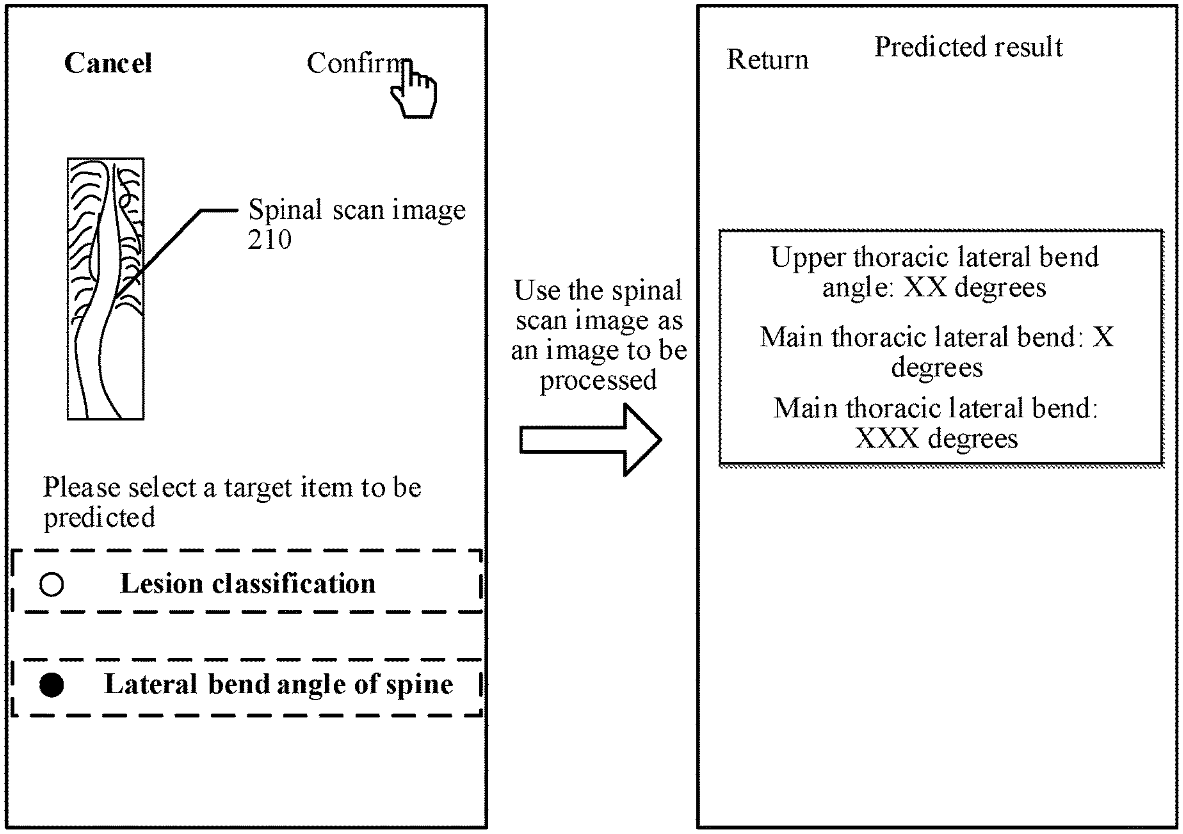
FIG. 2 is a schematic scenario diagram of image processing according to an embodiment of this disclosure.

In an example, it is assumed that the image processing model includes a first image processing model and a second image processing model; the first image processing model is configured to determine a lateral bend angle of spine in a spinal scan image; and the second image processing model is configured to determine a thyroid lesion area in a thyroid ultrasound image and a lesion classification corresponding to the thyroid lesion area. The computer device may display a page of an image to be processed, as shown in the left figure in FIG. 2, and the page includes a plurality of prediction items for a user to select. As can be seen from FIG. 2, the user uploads a spinal scan image 210 and selects an option of lateral bend angle of spine, that is, the user enters the processing requirement information, which indicates the target prediction item for the spinal scan image 210 is: a lateral bend angle of spine. In a case that the computer device detects a processing start operation by the user on the spinal scan image 210, the computer device may determine the spinal scan image 210 as the image to be processed, select from the plurality of target image processing models the first image processing model as the target image processing model that matches the processing requirement information, and call the first image processing model, to determine the lateral bend angle of spine in the spinal scan image. The lateral bend angle may include an upper thoracic lateral bend angle, a main thoracic lateral bend angle, and a thoracolumbar lateral bend angle.

Figure 3:
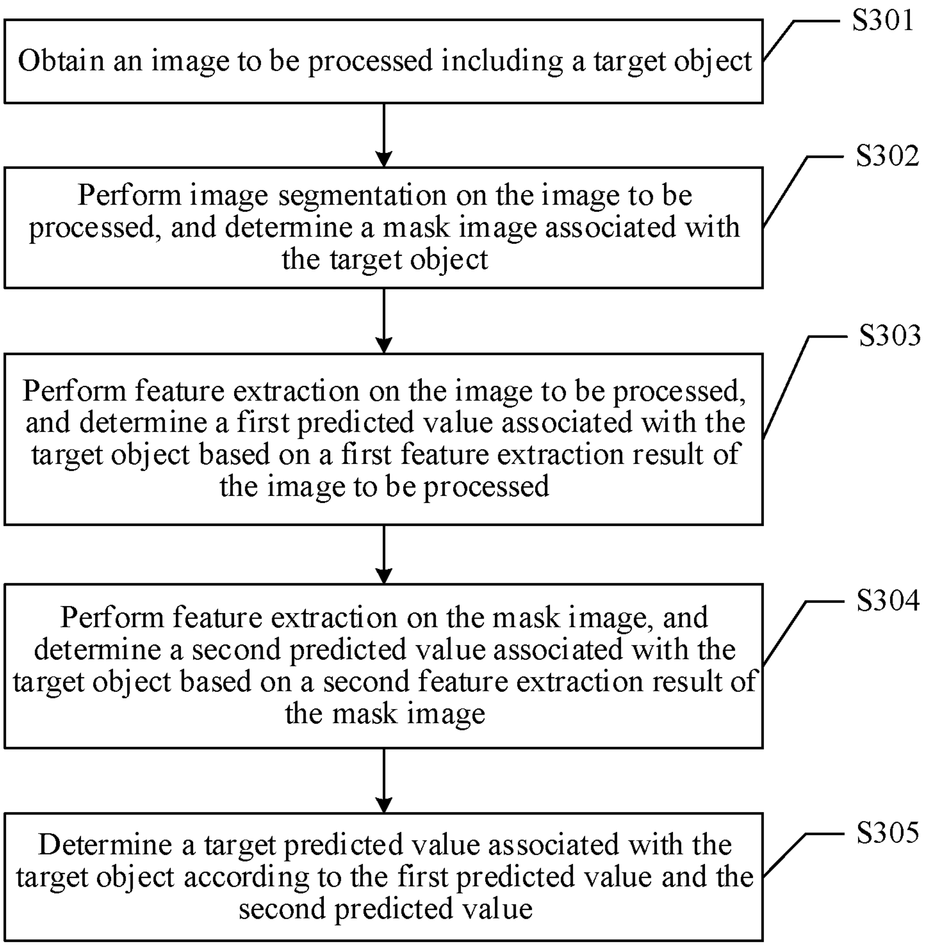
FIG. 3 is a schematic flowchart of an image processing method according to an embodiment of this disclosure.

Based on the model structure of the target image processing model, an embodiment of this disclosure provides an image processing method shown in FIG. 3. The image processing method may be performed by a computer device. The computer device may call the target image processing model shown in FIG. 1. The computer device herein may include, but is not limited to: a tablet computer, a laptop computer, a notebook computer, a desktop computer, and the like. As shown in FIG. 3, the image processing method may include the following steps S301 to S304:

In step S301, obtain an image to be processed including a target object.

In step S302, perform image segmentation on the image to be processed, and determine a mask image associated with the target object.

In an embodiment, a computer device inputs the image to be processed to the target image processing model, and calls a target segmentation network in the target image processing model to perform image segmentation on the image to be processed, to obtain the mask image associated with the target object. That is, the image to be processed is inputted to the target segmentation network in the target image processing model, to output and obtain the mask image. The mask image is consistent with the input image to be processed in size, and only an image of an area of interest is retained. For example, assuming that the target object is a spine, the area of interest herein is a spinal area.

In an exemplary implementation, during the image segmentation on the image to be processed, the target segmentation network may segment parts having different semantic features in the image to be processed, and generate the mask image associated with the target object based on a segmentation result. For example, the image to be processed is a spinal scan image and the target object is a spine; a background, a vertebra, and an intervertebral disc in the image to be processed can be segmented, and a mask image in which a background area, a vertebra area, and an intervertebral disc area are displayed in a differentiated manner is generated. A classification of each pixel in the mask image may include a background, a vertebra, or an intervertebral disc, pixel values corresponding to pixels of the background, the vertebra, and the intervertebral disc may be 0, 1, and 2, respectively, and the pixel values may be used for distinguishing classifications to which different pixels pertain.

Figure 4:
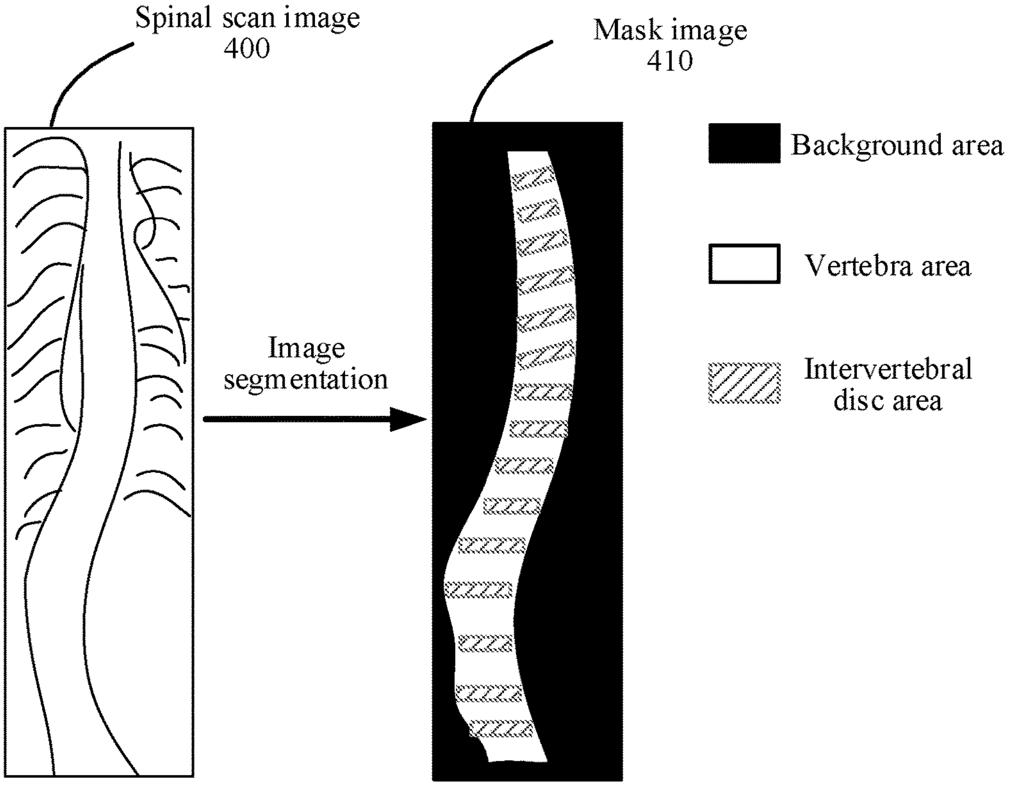
FIG. 4 is a schematic diagram of a mask image according to an embodiment of this disclosure.

For example, a mask image 410 corresponding to a spinal scan image 400 may be shown in FIG. 4. In the mask image 410, the background area is black, the vertebra area is white, and the intervertebral disc area is gray. As can be seen from FIG. 4, the mask image 410 corresponding to the spinal scan image 400 focus only on a spinal area (including the vertebra area and the intervertebral disc area).

In step S303, perform feature extraction on the image to be processed, and determine a first predicted value associated with the target object based on a first feature extraction result of the image to be processed.

In an example, the target image processing model further includes a target regression network. The target regression network may be a twin neural network, and the target regression network includes a first branch network and a second branch network. Feature extraction is performed on the image to be processed by the first branch network to obtain the first feature extraction result, and the first predicted value associated with the target object is determined based on the first feature extraction result.

In step S304, perform feature extraction on the mask image, and determine a second predicted value associated with the target object based on a second feature extraction result of the mask image.

The computer device calls the second branch network in the target regression network to perform feature extraction on the mask image, to obtain a second feature extraction result, and determines the second predicted value associated with the target object based on the second feature extraction result of the mask image.

In step S305, determine a target predicted value associated with the target object according to the first predicted value and the second predicted value.

In an embodiment, an average of the first predicted value and the second predicted value may be calculated, and the average of the first predicted value and the second predicted value is determined as the target predicted value associated with the target object.

In an embodiment, a weighted average of the first predicted value and the second predicted value is calculated and serves as the target predicted value associated with the target object.

It can be seen from the above content that the mask image focuses on an area of interest associated with the target object. In this embodiment of this disclosure, the first predicted value may be determined based on the mask image, the second predicted value may be determined based on the image to be processed, and the target predicted value associated with the target object may be determined in combination with the first predicted value and the second predicted value. In this way, in an aspect, compared with the manner of obtaining the target predicted value directly through the image to be processed, more attention can be paid to the area of interest associated with the target object, thereby improving the accuracy of prediction; and in another aspect, compared with the manner of determining the target predicted value by directly using the mask image, the prediction result (that is, the second predicted value) of the mask image can be optimized in combination with the prediction result (that is, the first predicted value) determined based on the image to be processed, to reduce the impact of a relatively large error of the mask image (for example, there is a relatively large deviation between the area of interest in the mask image and the actual area of interest) on the accuracy of a final prediction result.

In an exemplary implementation, the target image processing model is obtained by training the image processing model (shown in FIG. 1) based on the target task associated with the target object, the image processing model includes a segmentation network and a regression network, and during training of the image processing model, the segmentation network and the regression network may be independently trained, or the segmentation network and the regression network may be jointly trained.

The image processing model shown in FIG. 1 is refined. The segmentation network in the image processing model may include a feature extraction module, a pyramid sampling module, and an upsampling module. The model structure of a segmentation network 500 may be shown in FIG. 5. In an example, a feature extraction module 510 is a convolutional neural network (CNN), configured to extract an image feature of an input image to obtain a feature map; a pyramid sampling module 520 is configured to perform feature extraction on the feature map to obtain a feature map set; and an upsampling module 530 is configured to upsample the feature map set, restore each feature map in the feature map set to a same size as the input image, and determine a mask image corresponding to the input image based on an upsampling result. The first branch network and the second branch network included in the regression network in the image processing model each include a feature extraction module, a classification activation mapping (CAM) module, and a fully-connected layer. For example, the model structure of the regression network may be shown in FIG. 6, and feature extraction modules in a first branch network 610 and a second branch network 620 each may be a res18.

Figure 7:
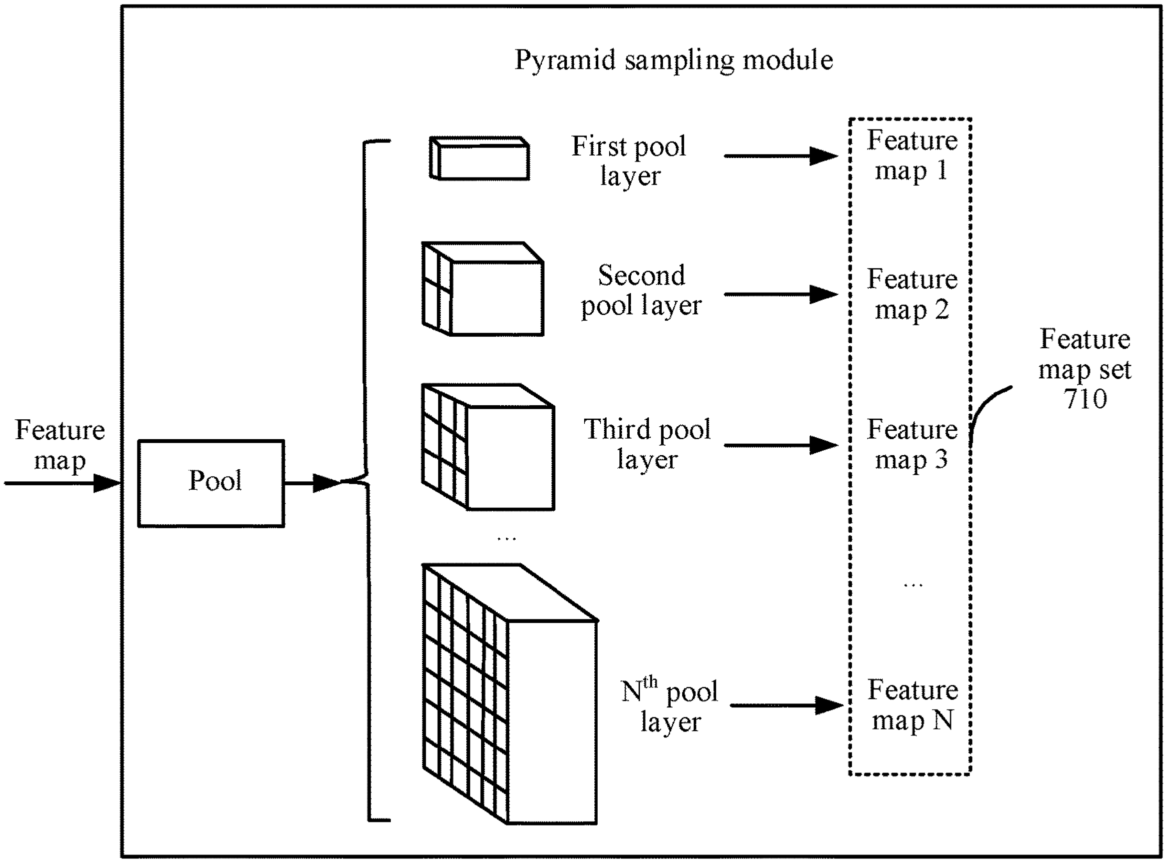
FIG. 7 is a schematic structural diagram of a pyramid sampling module according to an embodiment of this disclosure.

The structure of the pyramid sampling module may be shown in FIG. 7, through N (N is an integer greater than 1) pool layers, an input feature map is pooled to target sizes corresponding to the layers respectively, to obtain a feature map set 710, and the feature map set 710 includes a plurality of feature maps. For example, in a case that N is 4, target sizes corresponding to a first pool layer, a second pool layer, a third pool layer, and a fourth pool layer may respectively be: 1×1, 2×2, 3×3, and 6×6.

Because in a semantic segmentation task, it is desired to obtain a relatively large receptive field for features extracted from an image and to enable a resolution of a feature map not to drop dramatically (a dramatic loss in resolution means a loss in a great number of detailed information about image boundaries), which however are contradictory to each other. To obtain a relatively large receptive field, a relatively large convolutional kernel needs to be used or a relatively large stride needs to be used during pooling, the former requires an excessively large amount of calculation, and the latter causes the loss in the resolution. Therefore, in a case that the pyramid sampling module adopts the structure shown in FIG. 7, to obtain a relatively large receptive field in the process of feature extraction, usually a relatively large stride is used during pooling, resulting in a relatively low resolution of the feature map obtained through pooling, which affects a subsequent output result.

Figure 8:
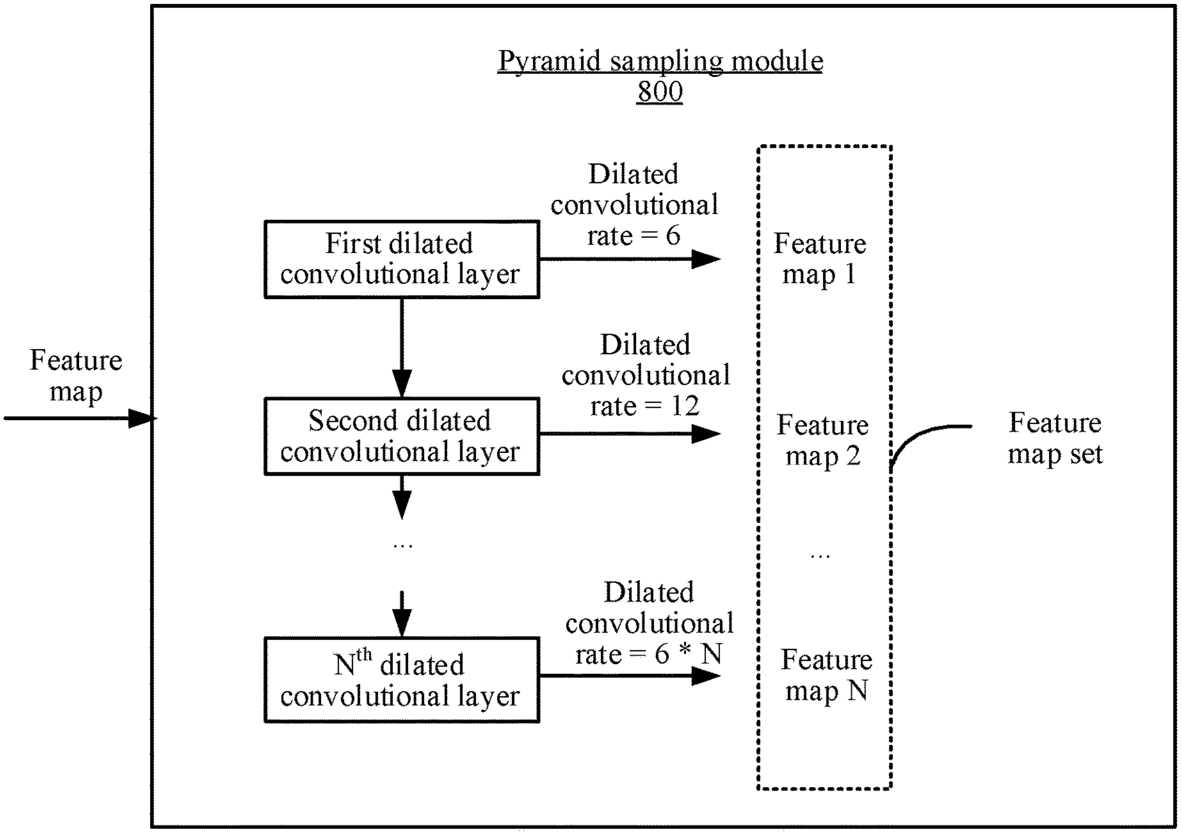
FIG. 8 is a schematic structural diagram of another pyramid sampling module according to an embodiment of this disclosure.

Based on this, the pyramid sampling module 700 shown in FIG. 7 may be optimized to obtain a pyramid sampling module 800 shown in FIG. 8, which includes N parallel dilated convolutional layers (N is an integer greater than 1). The pyramid sampling module 800 includes at least two parallel dilated convolutional layers. Each dilated convolutional layer corresponds to a different dilated convolutional rate. For example, N is 3, corresponding dilated convolutional rates of a first dilated convolutional layer, a second dilated convolutional layer, and a third dilated convolutional layer may respectively be: 6, 12, and 18. In an implementation, the pyramid sampling module may convolve an input feature map by each dilated convolutional layer based on a corresponding dilated convolutional rate, to obtain a feature map set. In this way, by capturing more feature information of an input feature map through dilated convolutional layers using different dilated convolutional rates, not only a relatively large receptive field can be obtained, but also the resolution of the finally obtained feature map is enabled not to lose dramatically.

Figure 5:
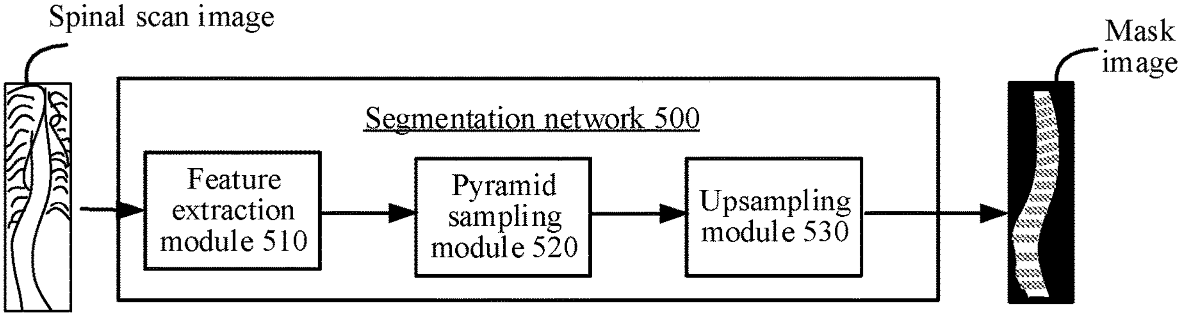
FIG. 5 is a schematic structural diagram of a segmentation network according to an embodiment of this disclosure.
Figure 6:
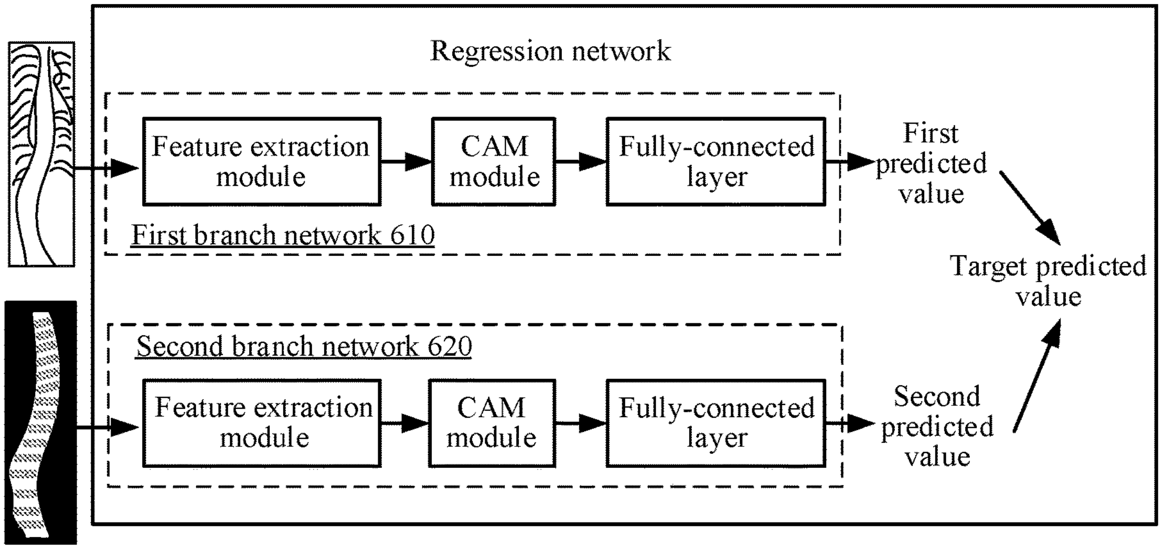
FIG. 6 is a schematic structural diagram of a regression network according to an embodiment of this disclosure.

In an embodiment, assuming that the segmentation network and the regression network are respectively shown in FIG. 5 and FIG. 8, the target object is a spine, and the target task associated with the target object is: predicting a lateral bend angle of spine in a spinal scan image. In this case, a training process of independent training of the segmentation network and the regression network may include the following steps (not shown):

In step S10, obtain a training set. For example, in an aspect, spinal scan images may be acquired, the sizes of the spinal scan images are uniformly adjusted to a designated size (for example, [512, 256]), and spinal scan images of which the sizes are adjusted to the designated size are determined as sample images in the training set; in addition, the training set may also be expanded by rescaling the sample images through random flip-flop, rotation (−45°, 45°), and factors between (0.85, 1.25). In another aspect, a target label of each sample image in the training set may be determined, and the target label may be added after the sample image is determined, or may be obtained together during acquisition of the spinal scan image. The target label carries two parts of information: first, mark lateral bend angle of spine; and second, mask mark information.

In step S11, train a segmentation network by using the training set, to obtain a trained target segmentation network.

In step S12, input sample images in the training set to the trained target segmentation network, to determine mask images corresponding to the sample images.

In step S13, train a regression network based on the sample images and the mask images corresponding to the sample images, to obtain a trained target regression network, so as to complete independent training of the segmentation network and regression network, to obtain a trained target image processing model.

Figure 9:
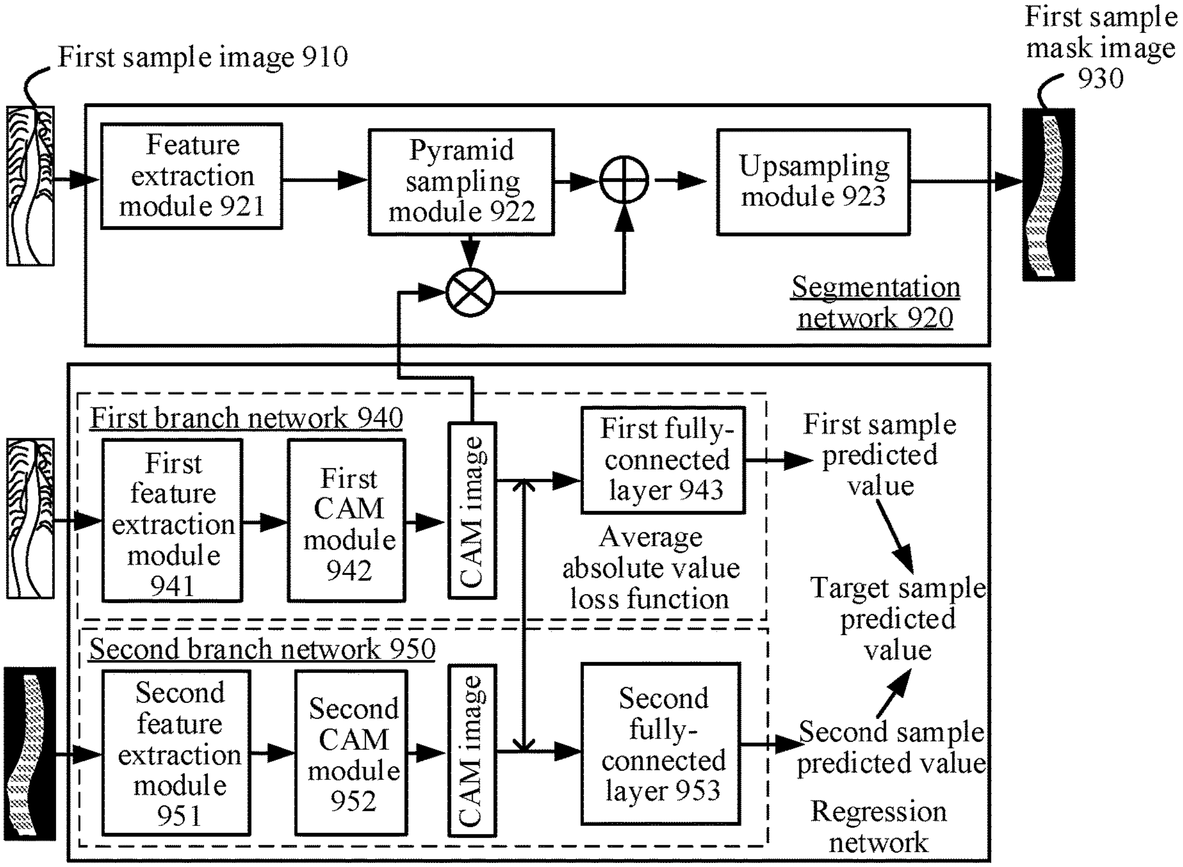
FIG. 9 is a schematic flowchart of joint training of a segmentation network and a regression network according to an embodiment of this disclosure.

In another embodiment, assuming that the segmentation network and the regression network are still shown in FIG. 5 and FIG. 8, the target object is a spine, and the target task associated with the target object is: predicting a lateral bend angle of spine in a spinal scan image. In this case, a training process of joint training of the segmentation network and the regression network (as shown in FIG. 9) includes the following procedures:

In step S20, obtain a training set. For an exemplary method for obtaining the training set, reference may be made to the relevant description of step S10, and is not repeated herein.

In step S21, obtain from the training set a first sample image 910 including a target object, and obtain a target label of the first sample image 910, the target label indicating a target mark value associated with the target object. Here, the first sample image 910 may be a spinal scan image of a designated size, and the target mark value associated with the target object may be a mark lateral bend angle of spine.

In step S22, perform image segmentation on the first sample image 910 by a segmentation network 920, and determine a first sample mask image 930 associated with the target object.

As can be seen from FIG. 9, the segmentation network 920 includes a feature extraction module 921, a pyramid sampling module 922, and an upsampling module 923. In an example, the feature extraction module 921 in the segmentation network 920 extracts a feature map of the first sample image 910, and the pyramid sampling module 922 performs feature extraction on the feature map, to obtain a feature map set, and the upsampling module 923 is called to upsample the feature map set, and to determine a first sample mask image 930 associated with the target object based on an upsampling result.

In an embodiment, in a case that the pyramid sampling module is shown in FIG. 7, the input feature map may be pooled through the pooling layers in the pyramid use module to target sizes corresponding to the layers, respectively, to obtain the feature map set.

Alternatively, in another embodiment, in a case that the pyramid sampling module is shown in FIG. 8, the feature map may be convolved by the dilated convolutional layers in the pyramid sampling module based on the respective corresponding dilated convolutional rates, to obtain the feature map set.

In step S23, perform feature extraction on the first sample image through a first branch network in a regression network, and determine a first sample predicted value associated with the target object based on a feature extraction result of the first sample image.

In an implementation, classification activation mapping may be performed on the feature extraction result of the first sample image, to obtain a first classification activation mapping graph, and a first sample predicted value associated with the target object is determined based on the first classification activation mapping graph. An image area associated with the target object is highlighted in the first classification activation mapping graph. The first classification activation mapping graph herein may be understood as a thermal map corresponding to the first sample image, the size of the thermal map is consistent with that of the first sample image, and the heat shown in the thermal map is relatively high in an area, in the first sample image, having a relatively large impact on the first sample predicted value. In this embodiment of this disclosure, in a case that the output result is the lateral bend angle of spine, an image area where a degree of spinal curvature is greater or a vertebral body is more inclined is an important area, and the heat, in the thermal map, corresponding to the important area is high. In a case that the target object is a spine, the image area associated with the target object highlighted in the first classification activation mapping graph is the important area.

As shown in FIG. 9, a first branch network 940 includes a first feature extraction module 941, a first classification activation mapping module 942, and a first fully-connected layer 943. During implementation of foregoing step S23, the first feature extraction module 941 extracts image features of the first sample image 910 and inputs a feature extraction result to the first classification activation mapping module 942, so that the first classification activation mapping module 942 performs classification activation mapping on the feature extraction result, to obtain a first classification activation mapping graph. The first fully-connected layer 943 performs data analysis on the first classification activation mapping graph, to determine a first sample predicted value associated with the target object. In a case that the target object is a spine, the first sample predicted value herein is a predicted lateral bend angle of spine in the first sample image.

In step S24, perform feature extraction on the first sample mask image through a second branch network in the regression network, and determine a second sample predicted value associated with the target object based on a feature extraction result of the sample mask image.

In an implementation, classification activation mapping may be performed on the feature extraction result of the first sample mask image, to obtain a second classification activation mapping graph, and a second sample predicted value associated with the target object is determined based on the second classification activation mapping graph. An image area associated with the target object is highlighted in the second classification activation mapping graph. The second classification activation mapping graph herein may be understood as a thermal map corresponding to a second sample image, the size of the thermal map is consistent with that of the first sample mask image, and the heat shown in the thermal map is relatively high in the area, in the first sample mask image, having a relatively large impact on the second sample predicted value.

As shown in FIG. 9, a second branch network 950 includes a second feature extraction module 951, a second classification activation mapping module 952, and a second fully-connected layer 953. During implementation of foregoing step S24, the second feature extraction module 951 extracts image features of the first sample mask image 930 and inputs a feature extraction result to the second classification activation mapping module 952, so that the second classification activation mapping module 952 performs classification activation mapping on the feature extraction result, to obtain a second classification activation mapping graph.

The second fully-connected layer 953 performs data analysis on the second classification activation mapping graph, to determine a second sample predicted value associated with the target object. In a case that the target object is a spine, the second sample predicted value herein is a predicted lateral bend angle of spine 930 in the first sample mask image.

It can be seen from the foregoing content that both the first classification activation mapping graph and the second classification activation mapping graph are derived from the same first sample image with the only difference in that the first classification activation mapping graph is obtained directly based on the first sample image and the second classification activation mapping graph is obtained based on the first sample mask image determined by image segmentation of the first sample image, but theoretically, heat distributions represented by the first classification activation mapping graph and the second classification activation mapping graph are to be consistent, that is, the important areas reflected by the first classification activation mapping graph and the second classification activation mapping graph (for example, the image area where a degree of spinal curvature is greater or a vertebral body is more inclined) are to be consistent.

Based on this, to better ensure the consistency of the classification activation mapping graphs obtained by the first branch network and the second branch network, in this embodiment of this disclosure, an average absolute value loss function may be obtained after the first classification activation mapping graph and the second classification activation mapping graph are obtained, to calculate a value of the average absolute value loss function according to the first classification activation mapping graph and the second classification activation mapping graph, and to update network parameters of the feature extraction modules (that is, the first feature extraction module and the second feature extraction module) in the first branch network and the second branch network in a direction of reducing the value of the average absolute value loss function. By analogy, each time a new sample image and a new sample mask image are inputted to the first branch network and the second branch network respectively, the same method may be used to calculate the value of the average absolute value loss function and to update the network parameters of the feature extraction modules in the first branch network and the second branch network with a goal of reducing the value of the average absolute value loss function; and by analogy, until the value of the average absolute value loss function is converged, updating of the feature extraction modules based on the average absolute value loss function is stopped.

The average absolute value loss function $\mathcal{L}_{AR}$ is:

$$\mathcal{L}_{AR} = |C(x) - C(f(x))|_1 \qquad \text{formula 1.1}$$

In formula 1.1, C(x) is a classification activation mapping graph obtained by the first branch network, for example, the first classification activation mapping graph, and C(f(x)) is a classification activation mapping graph obtained by the second branch network, for example, the second classification activation mapping graph. x represents an inputted image of the first branch network, and f(x) represents a mask image corresponding to an image x of the second branch network.

The convergence of the value of the average absolute value loss function may represent that the classification activation mapping graphs obtained by the first branch network and the second branch network have consistency, that is, in this case, the obtained classification activation mapping graphs can more accurately reflect an actual important area of the input image (for example, the image area where a degree of spinal curvature is greater or a vertebral body is more inclined).

Based on this, in a training process of the joint training of the segmentation network and the regression network in this embodiment of this disclosure, in a feasible implementation, after the value of the average absolute value loss function is converged, a current classification activation mapping graph obtained by the classification activation mapping module in the first branch network is inputted to the segmentation network, and the segmentation network is iteratively optimized according to the current classification activation mapping graph. An iterative optimization process is in the following:

Step 1: Obtain a feature extraction result obtained by performing feature extraction by a pyramid sampling module on a feature map of a new sample image inputted, the new sample image herein being an image inputted to the segmentation network after the sample image corresponding to the current classification activation mapping graph.

Step 2: Obtain a segmentation network optimization function, and calculate the segmentation network optimization function according to the current classification activation mapping graph and the feature extraction result.

Step 3: Upsample a calculation result by an upsampling module, and determine a new sample mask image associated with the target object based on an upsampling result. After the segmentation network determines the new sample mask image associated with the target object, the new sample image may further be inputted to the first branch network in the regression network, and the new sample mask image may be inputted to the second branch network in the regression network, so that the new sample image and the new sample mask image are used to train the regression network again. In this process, after the first branch network obtains the classification activation mapping graph corresponding to the new sample image, the classification activation mapping graph corresponding to the new sample image may be further inputted to the segmentation network, for example so that the segmentation network performs steps similar to step 3 according to the classification activation mapping graph corresponding to the new sample image, to continuously optimize the segmentation network iteratively; and the cycle is repeated in such way.

Step 4: Obtain mask mark information of the new sample image, and update a network parameter of the segmentation network and a segmentation network optimization function based on the new sample mask image and the mask mark information of the new sample image.

The segmentation network optimization function is: multiplying a product of the current classification activation mapping graph and the feature extraction result with a learning parameter α, and adding a multiplication result and the feature extraction result, an initial value of the learning parameter α being a designated value (for example, 0). The updating the segmentation network optimization function includes: updating the segmentation network optimization function in a gradient manner in a direction of increasing the learning parameter α.

For example, the segmentation network optimization function $f'_m(x)$ is shown in the following formula 1.2:

$$f'_m(x)=\alpha(C(x)\times f_m(x))+f_m(x) \quad \text{formula 1.2}$$

In formula 1.2, C(x) represents a current classification activation mapping graph, and $f_m(x)$ represents a feature extraction result outputted by the pyramid sampling module. An initial value of the learning parameter $\alpha$ is 0, and by gradually increasing the initial value during training, it can be seen from formula 1.2 that a global view of the input image is combined in the segmentation network optimization function and a context is aggregated selectively according to the classification activation mapping graph returned by the regression network, thereby improving an in-classification compactness and semantic consistency.

Step 5: Iteratively train the segmentation network according to an updated network parameter, to obtain a target segmentation network.

In an implementation, a target loss function $\mathcal{L}_{seg}(f(x),s)$ of the segmentation network is shown in the following formula 1.3:

formula 1.3

$$\mathcal{L}_{seg}(f(x),s)=\left(1-\frac{2\times\sum_j^m f(x_j)s_j}{\sum_j^m f(x_j)+\sum_j^m s_j}\right)+\lambda\left(-\frac{1}{m}\sum_j^m s_j\log(f(x_j))\right)$$

m represents a quantity of classifications of a target to be segmented, $f(x_j)$ and $s_j$ represent quantities of pixels of $j^{th}$ classifications of a predicted pixel value and an actual pixel value, respectively, j is a positive integer, and $\lambda$ is a weight parameter, which can be preset based on experimental measurement data. In this embodiment of this disclosure, in a case that the target object is a spine, to enable the segmentation network to focus on a shape/edges of the spine, each pixel in the mask image outputted by the segmentation network may be classified into three classifications (that is, the foregoing m is 3): a background, a vertebra, and an intervertebral disc; pixel values corresponding to pixels of the background, the vertebra, and the intervertebral disc may be 0, 1, and 2 respectively, which can be used for distinguishing the classifications to which different pixels pertain.

After obtaining the new sample mask image, the segmentation network may determine a pixel predicted value of each pixel in the new sample mask image, determine a mark value, of the new sample image corresponding to each pixel in the actual mask image, indicated by the mask mark information corresponding to the new sample image (that is, the actual pixel value), and calculate a value of the target loss function according to the predicted value and the mark value of each pixel. The network parameter of the segmentation network and the segmentation network optimization function are updated with a goal of reducing the value of the target loss function.

Alternatively, in the training process of the joint training of the segmentation network and the regression network in this embodiment of this disclosure, in another feasible implementation, each time after the classification activation mapping graph is obtained by the first branch network in the regression network, the classification activation mapping graph obtained by the first branch network is inputted to the segmentation network, so as to iteratively optimize the segmentation network. After obtaining the first classification activation mapping graph corresponding to the first sample image through the first branch network, a description of a process of iteratively optimizing the segmentation network is provided, and the process is in the following:

a. Input the first classification activation mapping graph to the segmentation network, and obtain a third feature extraction result of performing feature extraction on a feature map of a second sample image by the pyramid sampling module, where the second sample image is an image inputted to the segmentation network after the first sample image.
b. Obtain a segmentation network optimization function, and substitute the first classification activation mapping graph and the third feature extraction result to the segmentation network optimization function, to obtain a calculation result.
c. Upsample the calculation result by an upsampling module, and determine a second sample mask image associated with the target object based on an upsampling result.
d. Obtain mask mark information of the second sample image, and iteratively update a network parameter of the segmentation network and the segmentation network optimization function based on the second sample mask image and the mask mark information of the second sample image, to obtain the target segmentation network.

In an embodiment, assuming that the target object is a spine, a classification of each pixel in the second sample mask image includes a background, a vertebra, or an intervertebral disc, the second sample mask image presents a background area, a vertebra area, and an intervertebral disc area in a differentiated manner, the mask mark information of the second sample image indicates a mark classification of each pixel in the mark mask image corresponding to the second sample image, and the mark classification includes a background, a vertebra, or an intervertebral disc. An implementation of updating a network parameter of the segmentation network based on the second sample mask image and the mask mark information of the second sample image may be: calculating a value of the target loss function of the segmentation network based on the second sample mask image and the mask mark information of the second sample image, to further update the network parameter of the segmentation network with an adjustment goal of reducing the value of the target loss function. The target loss function may be shown in formula 1.3, and each pixel in all mask images (including the first mask image, the second mask image, the mark mask image corresponding to the second sample image, and the like) may be classified into three classifications (that is, the foregoing m is 3).

e. Iteratively train the segmentation network according to an updated network parameter, to obtain a target segmentation network.

Implementations of a to b may be referred to in the relevant descriptions of step 1 to step 5, and details are not repeated herein.

In step S25, determine a target sample predicted value associated with the target object based on the first sample predicted value and the second sample predicted value.

In step S26, update a network parameter of the regression network according to the target sample predicted value and the target mark value, and iteratively train the regression network according to an updated network parameter, to obtain a target regression network.

In an embodiment, an implementation of updating the network parameter in step S26 may be: obtaining a regression network loss function, calculating a value of the regression network loss function according to the target sample predicted value and the target mark value, and updating the network parameter of the regression network with a goal of reducing the value of the regression network loss function. The regression network may be iteratively trained according to an updated network parameter, until the value of the regression network loss function is converged, so that training of the regression network is completed, to obtain a trained target regression network.

In a case that the target object is a spine, the target sample predicted value may include any one or more of the following predicted lateral bend angles of spine: a predicted upper thoracic lateral bend angle, a predicted main thoracic lateral bend angle, and a predicted thoracolumbar lateral bend angle. The target mark value includes any one or more of the following mark lateral bend angles of spine: a mark upper thoracic lateral bend angle, a mark main thoracic lateral bend angle, and a mark thoracolumbar lateral bend angle; and the regression network loss function L is shown in the following formula 1.4:

$$L = \frac{\sum_{i}^{n} |y_i - g(x_i)|}{\sum_{i}^{n} |y_i + g(x_i) + \epsilon|} \quad \text{formula 1.4}$$

i represents a lateral bend angle a classification i, and a lateral bend angle of spine of classification i includes: an upper thoracic lateral bend angle, a main thoracic lateral bend angle, or a thoracolumbar lateral bend angle. The classification represented by i=1 is: an upper thoracic lateral bend angle; the classification represented by i=2 is: a main thoracic lateral bend angle; and the classification represented by i=3 is: a thoracolumbar lateral bend angle; in this case, n=3; and $\epsilon$ is a smoothing factor, $y_i$ represents a mark lateral bend angle of spine of the classification i, and $g(x_i)$ represents a predicted lateral bend angle of spine of the classification i. $\epsilon$ is a relatively small value greater than 0, for example, may be $10^{-10}$, thereby avoiding a situation where the denominator is zero in formula 1.4.

Figure 10:
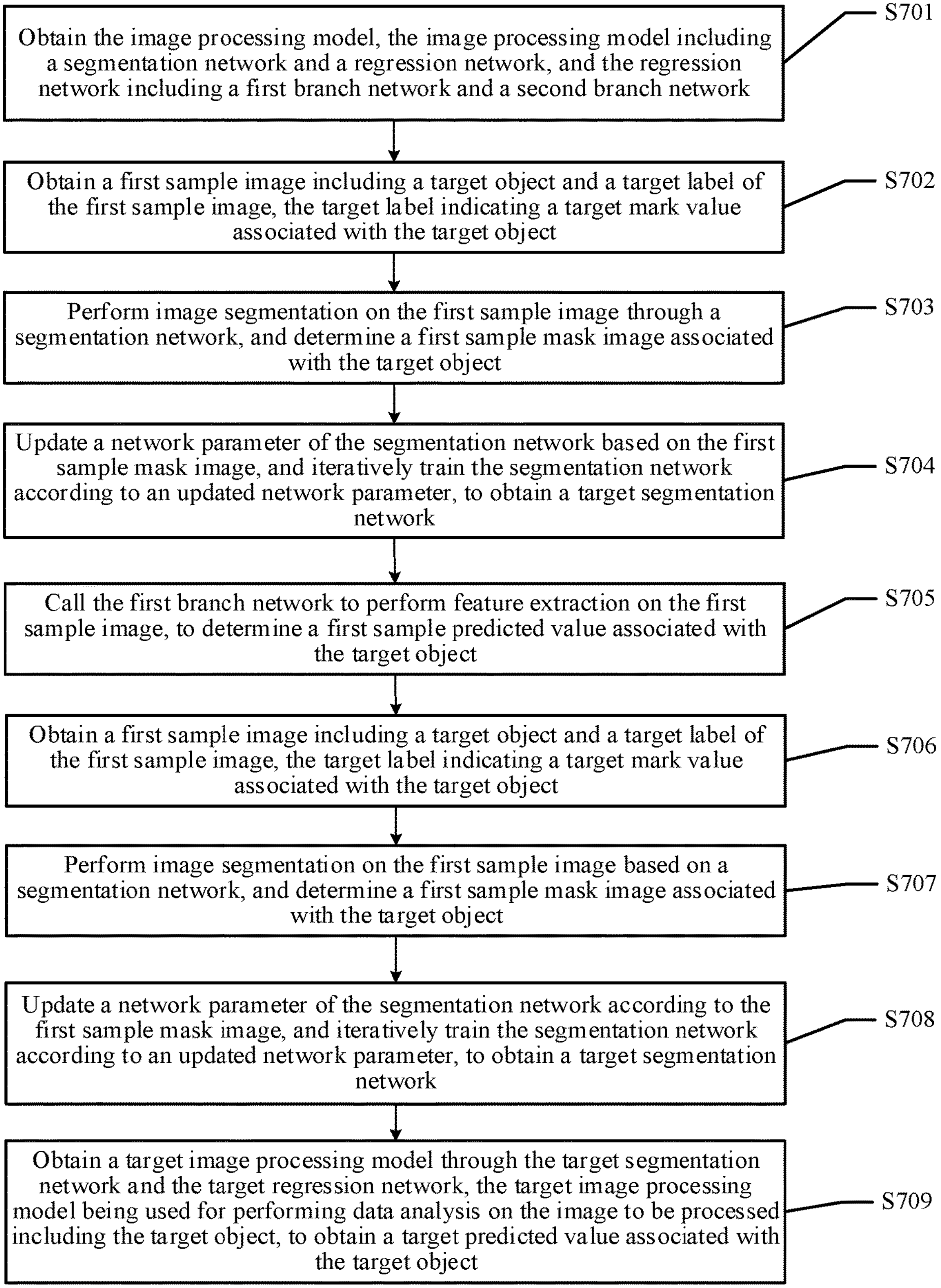
FIG. 10 is a schematic flowchart of another image processing method according to an embodiment of this disclosure.

Based on the model structure of the image processing model, an embodiment of this disclosure provides an image processing method shown in FIG. 10. The image processing method may be performed by a computer device. As shown in FIG. 10, the image processing method may include the following steps S701 to S708:

In step S701, obtain the image processing model, the image processing model including a segmentation network and a regression network, and the regression network including a first branch network and a second branch network. For example, the model structure of the image processing model may be shown in FIG. 1.

In step S702, obtain a first sample image including a target object and a target label of the first sample image, the target label indicating a target mark value associated with the target object.

In step S703, perform image segmentation on the first sample image through a segmentation network, and determine a first sample mask image associated with the target object.

In step S704, update a network parameter of the segmentation network based on the first sample mask image, and iteratively train the segmentation network according to an updated network parameter, to obtain a target segmentation network.

In an embodiment, during independent training of the segmentation network and the regression network, mask mark information for the first sample image is obtained, a value of a target loss function of the segmentation network is calculated based on the first sample mask image and the mask mark information of the first sample image, and the network parameter of the segmentation network is updated with a goal of reducing the value of the target loss function.

In another embodiment, during joint training of the segmentation network and the regression network, the first classification activation mapping graph is inputted to the segmentation network, and a third feature extraction result of performing feature extraction on a feature map of a second sample image by the pyramid sampling module is obtained, where the second sample image is an image inputted to the segmentation network after the first sample image. A segmentation network optimization function is obtained, the segmentation network optimization function is calculated according to the first classification activation mapping graph and the third feature extraction result, a calculation result is upsampled by the upsampling module, and a second sample mask image associated with the target object is determined based on an upsampling result. In an example, mask mark information of the second sample image is obtained, and the network parameter of the segmentation network is updated based on the second sample mask image and the mask mark information of the second sample image.

In step S705, call the first branch network to perform feature extraction on the first sample image, to determine a first sample predicted value associated with the target object.

In step S706, call the second branch network to perform feature extraction on the first sample mask image, to determine a second sample predicted value associated with the target object.

In step S707, determine a target sample predicted value associated with the target object based on the first sample predicted value and the second sample predicted value.

In step S708, update a network parameter of the regression network according to the target sample predicted value and the target mark value, and iteratively train the regression network according to an updated network parameter, to obtain a target regression network.

In step S709, obtain a target image processing model through the target segmentation network and the target regression network, the target image processing model being used for performing data analysis on the image to be processed including the target object, to obtain a target predicted value associated with the target object.

In an example, the target image processing model is constructed by the target segmentation network and the target regression network. In a case that the target predicted value associated with the target object needs to be predicted, the image to be processed including the target object is obtained, and the target segmentation network in the target image processing model is called to perform image segmentation on the image to be processed, to determine the mask image associated with the target object. In an aspect, the first branch network in the target regression network is called to perform feature extraction on the image to be processed, and the first predicted value associated with the target object is determined based on a feature extraction result of the image to be processed. In another aspect, the second branch network is called to perform feature extraction on the mask image, the second predicted value associated with the target object is determined based on a feature extraction result of the mask image, and further the target predicted value associated with the target object is determined according to the first predicted value and the second predicted value. The process of joint training may be referred to in the foregoing description of joint training, and details are not repeated herein.

Figures 11, 12:
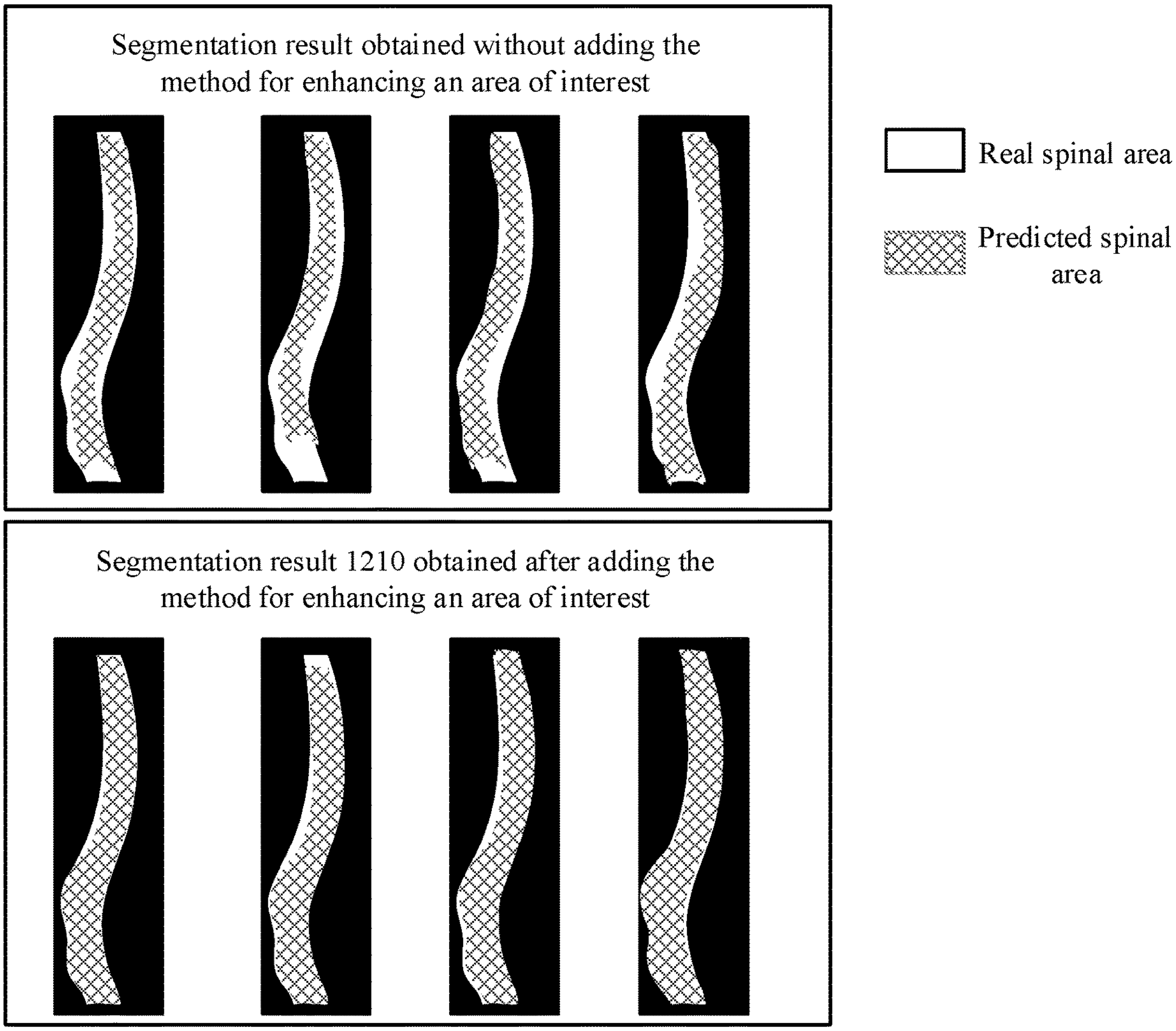
FIG. 11 is a comparison diagram of experimental results according to an embodiment of this disclosure.
FIG. 12 is a comparison diagram of segmentation results according to an embodiment of this disclosure.
Figure 13:
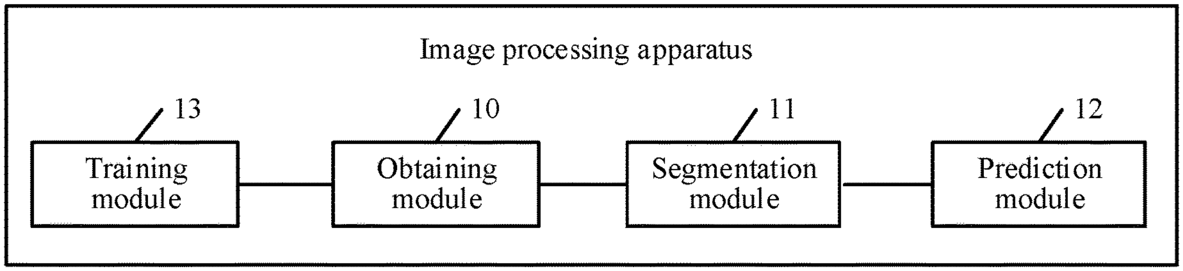
FIG. 13 is a schematic structural diagram of an image processing apparatus according to an embodiment of this disclosure.
Figure 14:
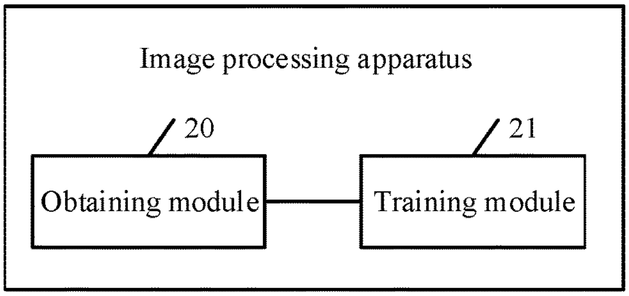
FIG. 14 is a schematic structural diagram of another image processing apparatus according to an embodiment of this disclosure.

Through the foregoing content, compared with a related image processing model, in the target image processing model provided in this embodiment of this disclosure, the segmentation network, the average absolute value loss function, and the method for enhancing an area of interest are added, and these methods are superimposed in turn based on the related image processing model, to perform a large quantity of lateral bend angle of spine prediction experiments, so that an experimental result diagram shown in FIG. 11 and a segmentation result comparison diagram shown in FIG. 12 can be obtained. In FIG. 11, direct regression 1101 represents that the target image processing model includes only a regression network; segmentation 1102 represents that a segmentation network is added to the target image processing model; an average absolute value loss function 1103 represents that the average absolute value loss function is introduced in a training process of training an image processing model to obtain a target image processing model; and area of interest enhancement 1104 represents that in the training process, a classification activation mapping graph obtained by the first branch network in the regression network is returned to the segmentation network of the important area (the image area where a degree of spinal curvature is greater or a vertebral body is more inclined), which increases learning of the spinal area by the segmentation network and enhances the accuracy of the segmentation network in segmenting the area of interest (that is, the spinal area) from the spinal scan image.

From the experimental result shown in FIG. 11, it can be seen that in the target image processing model provided in this embodiment of this disclosure, by introducing the segmentation network, the average absolute value loss function, and the method for enhancing an area of interest, the accuracy of predicting a lateral bend angle of spine can be greatly increased. From the segmentation result shown in FIG. 12, it can be seen that by the method for enhancing an area of interest, the accuracy of a segmentation result 1210 (that is, the mask image corresponding to the spinal scan image) outputted by the segmentation network can be greatly increased.

A description of an exemplary application of the image processing method is provided below by, for example, applying the image processing method mentioned to a target application scenario of predicting a lateral bend angle of spine in an X-ray scan image of the spine.

In the target application scenario, the target object is a spine, and the target predicted value associated with the target object is a predicted lateral bend angle of spine. In an example, the target image processing model is obtained by training the image processing model shown in FIG. 1. The target image processing model includes a target segmentation network and a target regression network. The computer device may call the target segmentation network in the target image processing model to perform image segmentation on the X-ray scan image of spine, and determine a mask image in which a spinal area is focused. A classification of each pixel in the mask image is classified into a background, a vertebra, and an intervertebral disc. The X-ray scan image of spine and the mask image are respectively used as inputs of the first branch network and the second branch network in the target regression network, feature extraction is performed on the X-ray scan image of spine by the first branch network, and a first predicted lateral bend angle of spine (that is, the first predicted value) is determined based on a feature extraction result of the X-ray scan image of spine; and feature extraction is performed on the mask image through the second branch network, a second predicted lateral bend angle of spine (that is, the second predicted value) is determined based on a feature extraction result of the mask image, and a final predicted lateral bend angle of spine (that is, the target predicted value) is determined based on the first predicted lateral bend angle of spine and the second predicted lateral bend angle of spine. Subsequently, a doctor may diagnose a condition of the patient through the predicted lateral bend angle of spine, so that the doctor is assisted to make a disease diagnosis more quickly.

According to the foregoing content, the mask image is focused on the spinal area, and in this embodiment of this disclosure, the first predicted lateral bend angle of spine may be determined based on the mask image of the spinal area, the second predicted lateral bend angle of spine may be determined based on the X-ray scan image of spine, and the final predicted lateral bend angle of spine may be determined in combination with the first predicted lateral bend angle of spine and the second predicted lateral bend angle of spine. In this way, in an aspect, compared with the method for obtaining the final predicted lateral bend angle of spine directly through the X-ray scan image of spine, more attention can be paid to the spinal area in the process of predicting the lateral bend angle of spine, thereby increasing the accuracy of prediction. In another aspect, compared to the method for determining the final predicted lateral bend angle of spine directly through the mask image, the prediction result (that is, the second predicted lateral bend angle of spine) of the mask image may be optimized in combination with the first predicted lateral bend angle of spine determined based on a raw image (that is, the X-ray scan image of spine), thereby reducing the impact on the accuracy of the final predicted result caused by a relatively large error in the mask image (for example, there is a relatively large deviation between the spinal area in the mask image and the actual spinal area).

An embodiment of this disclosure further provides a computer storage medium, the computer storage medium storing program instructions, and the program instructions, when executed, implementing the corresponding method described in the foregoing embodiments. In an example, the computer storage medium includes a non-transitory computer-readable storage medium.

Again referring to FIG. 10, FIG. 10 is a schematic structural diagram of an image processing apparatus according to an embodiment of this disclosure. The image processing apparatus according to this embodiment of this disclosure may be disposed in the computer device, or may be a computer program (including program code) running in the computer device.

In an implementation of the apparatus in this embodiment of this disclosure, the apparatus includes an obtaining module 10, a segmentation module 11, and a prediction module 12. One or more modules, submodules, and/or units of the apparatus can be implemented by processing circuitry, software, or a combination thereof, for example.

The obtaining module 10 is configured to obtain an image to be processed including a target object. The segmentation module 11 is configured to perform image segmentation on the image to be processed, and determine a mask image associated with the target object. The prediction module 12 is configured to perform feature extraction on the image to be processed, and determine a first predicted value associated with the target object based on a first feature extraction result of the image to be processed.

The prediction module 12 is further configured to perform feature extraction on the mask image, and determine a second predicted value associated with the target object based on a second feature extraction result of the mask image. The prediction module 12 is further configured to determine a target predicted value associated with the target object according to the first predicted value and the second predicted value.

In an embodiment, the segmentation module 11 is further configured to input the image to be processed to a target segmentation network in a target image processing model, to output and obtain the mask image.

In an embodiment, the target image processing model further includes a target regression network, and the target regression network includes a first branch network and a second branch network; the prediction module 12 is further configured to perform feature extraction on the image to be processed by the first branch network, to obtain the first feature extraction result; and determine the first predicted value associated with the target object based on the first feature extraction result.

In an embodiment, the prediction module 12 is further configured to perform feature extraction on the mask image through the second branch network, to obtain the second feature extraction result; and determine the second predicted value associated with the target object based on the second feature extraction result.

In an embodiment, the apparatus further includes a training module 13. The training module 13 is configured to obtain a first sample image including a target object, and obtain a target label of the first sample image, where the target label indicates a target mark value associated with the target object. The training module 13 is further configured to perform image segmentation on the first sample image through a segmentation network, and determine a first sample mask image associated with the target object. The training module 13 is further configured to perform feature extraction on the first sample image through the first branch network in the regression network, and determine a first sample predicted value associated with the target object based on a feature extraction result of the first sample image. The training module 13 is further configured to perform feature extraction on the first sample mask image through the second branch network in the regression network, and determine a second sample predicted value associated with the target object based on a feature extraction result of the sample mask image. The training module 13 is further configured to determine a target sample predicted value associated with the target object based on the first sample predicted value and the second sample predicted value. The training module 13 is further configured to update a network parameter of the regression network according to the target sample predicted value and the target mark value, and iteratively train the regression network according to an updated network parameter, to obtain the target regression network.

In an embodiment, the training module 13 is further configured to perform classification activation mapping on the feature extraction result of the first sample image, to obtain a first classification activation mapping graph, where the first classification activation mapping graph highlights an image area associated with the target object; and determine the first sample predicted value associated with the target object based on the first classification activation mapping graph.

In an embodiment, the segmentation network includes a feature extraction module, a pyramid sampling module, and an upsampling module. The training module 13 is further configured to extract a feature map of the first sample image by the feature extraction module; perform feature extraction on the feature map by the pyramid sampling module, to obtain a feature map set; and upsample the feature map set by the upsampling module, and determine the first sample mask image associated with the target object based on an upsampling result.

In an embodiment, the pyramid sampling module includes at least two parallel dilated convolutional layers, where each dilated convolutional layer corresponds to a different dilated convolutional rate; and the training module 13 is further configured to: convolve the feature map by each dilated convolutional layer in the pyramid sampling module based on the corresponding dilated convolutional rate, to obtain the feature map set.

In an embodiment, the training module 13 is further configured to input the first classification activation mapping graph to the segmentation network, and obtain a third feature extraction result of performing feature extraction on a feature map of a second sample image by the pyramid sampling module, where the second sample image is an image inputted to the segmentation network after the first sample image; obtain a segmentation network optimization function, and substitute the first classification activation mapping graph and the third feature extraction result to the segmentation network optimization function, to obtain a calculation result; upsample the calculation result by the upsampling module, and determine a second sample mask image associated with the target object based on an upsampling result; and obtain mask mark information of the second sample image, and update a network parameter of the segmentation network and the segmentation network optimization function based on the second sample mask image and the mask mark information of the second sample image, to obtain the target segmentation network.

In an embodiment, the first branch network and the second branch network each include a feature extraction module; the feature extraction module in the first branch network is configured to perform feature extraction on the first sample image; the feature extraction module in the second branch network is configured to perform feature extraction on the sample mask image; the second sample predicted value is determined based on a second classification activation mapping graph obtained by performing classification activation mapping on the feature extraction result of the sample mask image; and the training module 13 is further configured to obtain an average absolute value loss function; calculate a value of the average absolute value loss function according to the first classification activation mapping graph and the second classification activation mapping graph; and update network parameters of the feature extraction modules in the first branch network and the second branch network with a goal of reducing the value of the average absolute value loss function.

In an embodiment, the segmentation network optimization function is: multiplying a product of the first classification activation mapping graph and the feature extraction result with a learning parameter α, and adding a multiplication result and the feature extraction result, an initial value of the learning parameter α being a designated value; and the training module 13 is further configured to update the segmentation network optimization function in a direction of increasing the learning parameter α.

In an embodiment, the training module 13 is further configured to obtain a regression network loss function; substitute the target sample predicted value and the target mark value to the regression network loss function, to obtain a loss value; and update the network parameter of the regression network with a goal of reducing the loss value.

In an embodiment, in a case that the target object is a spine, the target sample predicted value includes any one or more of the following predicted lateral bend angles of spine: a predicted upper thoracic lateral bend angle, a predicted main thoracic lateral bend angle, and a predicted thoracolumbar lateral bend angle. The target mark value includes any one or more of the following mark lateral bend angles of spine: a mark upper thoracic lateral bend angle, a mark main thoracic lateral bend angle, and a mark thoracolumbar lateral bend angle.

In an embodiment, the target object is a spine, a classification of each pixel in the mask image includes a background, a vertebra, or an intervertebral disc, the mask image presents a background area, a vertebra area, and an intervertebral disc area in a differentiated manner, the mask mark information indicates a mark classification of each pixel in the mark mask image corresponding to the second sample image, and the mark classification includes a background, a vertebra, or an intervertebral disc; and the training module 13 is further configured to calculate a value of a target loss function of the segmentation network based on the second sample mask image and the mask mark information of the second sample image; and update the network parameter of the segmentation network in a direction of reducing the value of the target loss function.

In this embodiment of this disclosure, the implementation of the modules may be referred to in the description of relevant content in the embodiments corresponding to the accompanying drawings.

The image processing apparatus in this embodiment of this disclosure may obtain an image to be processed including a target object, perform image segmentation on the image to be processed, and determine a mask image associated with the target object; and perform feature extraction on the image to be processed, determine a first predicted value associated with the target object based on a feature extraction result of the image to be processed, perform feature extraction on the mask image, determine a second predicted value associated with the target object based on a feature extraction result of the mask image, and further determine a target predicted value associated with the target object according to the first predicted value and the second predicted value. The accuracy of the target predicted value can be increased in combination with the image segmentation technology.

Again referring to FIG. 11, FIG. 11 is a schematic structural diagram of an image processing apparatus according to an embodiment of this disclosure. The image processing apparatus according to this embodiment of this disclosure may be disposed in the computer device, or may be a computer program (including program code) running in the computer device.

In an implementation of the apparatus in this embodiment of this disclosure, the apparatus includes an obtaining module 20 and a training module 21. One or more modules, submodules, and/or units of the apparatus can be implemented by processing circuitry, software, or a combination thereof, for example.

The obtaining module 20 is configured to obtain an image processing model, the image processing model including a segmentation network and a regression network, and the regression network including a first branch network and a second branch network. The obtaining module 20 is further configured to obtain a first sample image including a target object and a target label of the first sample image, the target label indicating a target mark value associated with the target object.

The training module 21 is configured perform image segmentation on the first sample image through a segmentation network, and determine a first sample mask image associated with the target object. The training module 21 is further configured to update a network parameter of the segmentation network based on the first sample mask image, and iteratively train the segmentation network according to an updated network parameter, to obtain a target segmentation network. The training module 21 is further configured to call the first branch network to perform feature extraction on the first sample image, to determine a first sample predicted value associated with the target object. The training module 21 is further configured to call the second branch network to perform feature extraction on the first sample mask image, to determine a second sample predicted value associated with the target object. The training module 21 is further configured to determine a target sample predicted value associated with the target object based on the first sample predicted value and the second sample predicted value. The training module 21 is further configured to update a network parameter of the regression network according to the target sample predicted value and the target mark value, and iteratively train the regression network according to an updated network parameter, to obtain a target regression network. The training module 21 is further configured obtain a target image processing model through the target segmentation network and the target regression network, the target image processing model being used for performing data analysis on the image to be processed including the target object, to obtain a target predicted value associated with the target object.

Figure 15:
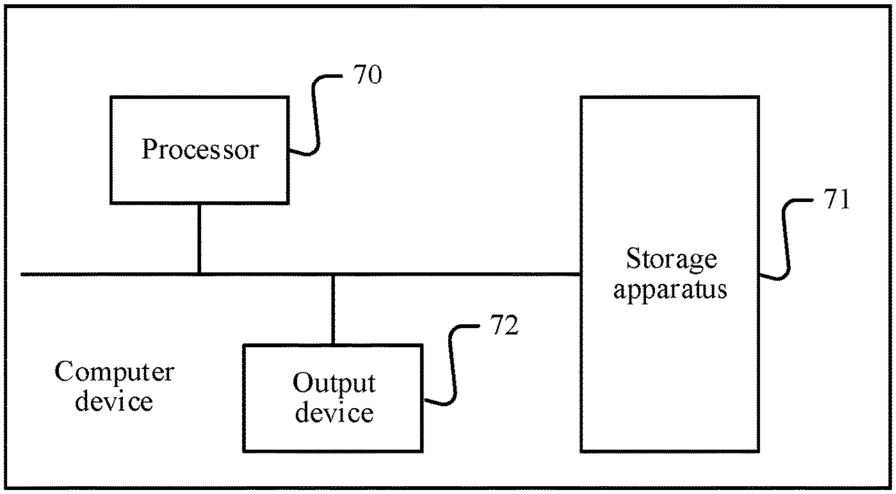
FIG. 15 is a schematic structural diagram of a computer device according to an embodiment of this disclosure.

FIG. 15 is a schematic structural diagram of a computer device according to an embodiment of this disclosure. The computer device in this embodiment of this disclosure includes a structure such as a power supply module, and includes processing circuitry (e.g., a processor 70), a storage apparatus 71, and an output device 72. The processor 70, the storage apparatus 71, and the output device 72 can exchange data with each other, and the processor 70 implements the corresponding image processing function.

The storage apparatus 71 may include a volatile memory (volatile memory), such as a random-access memory (RAM); the storage apparatus 71 may also include a non-volatile memory, such as a flash memory, or a solid-state drive (SSD); and the storage apparatus 71 may further include a combination of the types of memories.

The processor 70 may be a central processing unit 70 (CPU). In an embodiment, the processor 70 may also be a graphics processing unit (Graphics Processing Unit, GPU) 70. The processor 70 can alternatively be a combination of a CPU and a GPU. In a computer device, a plurality of CPUs and GPUs may be included for corresponding image processing according to needs.

The output device 72 may include a display (LCD or the like), a speaker, or the like, and may be configured to output a target predicted value associated with a target object.

In an embodiment, the storage apparatus 71 is configured to store program instructions. The processor 70 may call the program instructions to implement the methods involved in the embodiments of this disclosure.

In a first possible implementation, the processor 70 of the computer device calls the program instructions stored in the storage apparatus 71 for obtaining the image to be processed including the target object;

performing image segmentation on the image to be processed, and determining a mask image associated with the target object;

performing feature extraction on the image to be processed, and determining a first predicted value associated with the target object based on a first feature extraction result of the image to be processed;

performing feature extraction on the mask image, and determining a second predicted value associated with the target object based on a second feature extraction result of the mask image; and determining a target predicted value associated with the target object according to the first predicted value and the second predicted value.

In an embodiment, the processor 70 is further configured to:

call target segmentation network to perform image segmentation on the image to be processed, and obtain a mask image associated with the target object.

In an embodiment, the processor 70 is further configured to:

call the first branch network in the target regression network to perform feature extraction on the image to be processed; and determine a first predicted value associated with the target object based on a feature extraction result of the image to be processed.

In an embodiment, the processor 70 is further configured to:

call the second branch network in the target regression network to perform feature extraction on the mask image; and determine a second predicted value associated with the target object based on a feature extraction result of the mask image.

In an embodiment, the processor 70 is further configured to:

obtain a first sample image including a target object, and obtain a target label of the first sample image, where the target label indicates a target mark value associated with the target object;

perform image segmentation on the first sample image through a segmentation network, and determine a first sample mask image associated with the target object;

perform feature extraction on the first sample image through the first branch network in the regression network, and determine a first sample predicted value associated with the target object based on a feature extraction result of the first sample image;

perform feature extraction on the first sample mask image through the second branch network in the regression network, and determine a second sample predicted value associated with the target object based on a feature extraction result of the sample mask image;

determine a target sample predicted value associated with the target object based on the first sample predicted value and the second sample predicted value; and update a network parameter of the regression network according to the target sample predicted value and the target mark value, and iteratively train the regression network according to an updated network parameter, to obtain the target regression network.

In an embodiment, the processor 70 is further configured to:

perform classification activation mapping on the feature extraction result of the first sample image, to obtain a first classification activation mapping graph, where the first classification activation mapping graph highlights an image area associated with the target object; and determine the first sample predicted value associated with the target object based on the first classification activation mapping graph.

In an embodiment, the segmentation network includes a feature extraction module, a pyramid sampling module, and an upsampling module; and the processor 70 is further configured to:

extract a feature map of the first sample image by a feature extraction module in the segmentation network;

perform feature extraction on the feature map by the pyramid sampling module, to obtain a feature map set; and call the upsampling module to upsample the feature map set, and determine a first sample mask image associated with the target object based on an upsampling result.

In an embodiment, the pyramid sampling module includes a plurality of parallel dilated convolutional layers, where each dilated convolutional layer corresponds to a different dilated convolutional rate; and the processor 70 is further configured to: convolve the feature map by each dilated convolutional layer in the pyramid sampling module based on the corresponding dilated convolutional rate, to obtain the feature map set.

In an embodiment, the processor 70 is further configured to:

input the first classification activation mapping graph to the segmentation network, and obtain a feature extraction result of performing feature extraction on a feature map of a second sample image by the pyramid sampling module, where the second sample image is an image inputted to the segmentation network after the first sample image;

obtain a segmentation network optimization function, and calculate the segmentation network optimization function according to the first classification activation mapping graph and the feature extraction result;

upsample the calculation result by the upsampling module, and determine a second sample mask image associated with the target object based on an upsampling result; and obtain mask mark information of the second sample image, and update a network parameter of the segmentation network and the segmentation network optimization function based on the second sample mask image and the mask mark information of the second sample image;

iteratively train the segmentation network according to an updated network parameter, to obtain a target segmentation network.

In an embodiment, the first branch network and the second branch network each include a feature extraction module; the feature extraction module in the first branch network is configured to perform feature extraction on the first sample image; the feature extraction module in the second branch network is configured to perform feature extraction on the sample mask image; the second sample predicted value is determined based on a second classification activation mapping graph obtained by performing classification activation mapping on the feature extraction result of the sample mask image; and the processor 70 is further configured to:

obtain an average absolute value loss function;

calculate a value of the average absolute value loss function according to the first classification activation mapping graph and the second classification activation mapping graph; and update network parameters of the feature extraction modules in the first branch network and the second branch network in a direction of reducing the value of the average absolute value loss function.

In an embodiment, the segmentation network optimization function is: multiplying a product of the first classification activation mapping graph and the feature extraction result with a learning parameter $\alpha$, and adding a multiplication result and the feature extraction result, an initial value of the learning parameter $\alpha$ being a designated value; and the processor 70 is further configured to:

update the segmentation network optimization function in a direction of increasing the learning parameter $\alpha$.

In an embodiment, the processor 70 is further configured to:

obtain a regression network loss function;

calculate a value of the regression network loss function according to the target sample predicted value and the target mark value; and update the network parameter of the regression network in a direction of reducing the value of the regression network loss function.

In an embodiment, in a case that the target object is a spine, the target sample predicted value includes any one or more of the following predicted lateral bend angles of spine: a predicted upper thoracic lateral bend angle, a predicted main thoracic lateral bend angle, and a predicted thoracolumbar lateral bend angle. The target mark value includes any one or more of the following mark lateral bend angles of spine: a mark upper thoracic lateral bend angle, a mark main thoracic lateral bend angle, and a mark thoracolumbar lateral bend angle.

In an embodiment, the target object is a spine, a classification of each pixel in the mask image includes a background, a vertebra, or an intervertebral disc, the mask image presents a background area, a vertebra area, and an intervertebral disc area in a differentiated manner, the mask mark information indicates a mark classification of each pixel in the mark mask image corresponding to the second sample image, and the mark classification includes a background, a vertebra, or an intervertebral disc; and the processor 70 is further configured to:

calculate a value of a target loss function of the segmentation network based on the second sample mask image and the mask mark information of the second sample image; and update the network parameter of the segmentation network in a direction of reducing the value of the target loss function.

In another possible implementation, the processor 70 of the computer device calls the program instructions stored in the storage apparatus 71, configured to obtain an image processing model, the image processing model including a segmentation network and a regression network, and the regression network including a first branch network and a second branch network; obtain a first sample image including a target object and a target label of the first sample image, the target label indicating a target mark value associated with the target object; perform image segmentation on the first sample image through a segmentation network, and determine a first sample mask image associated with the target object; update a network parameter of the segmentation network based on the first sample mask image, and iteratively train the segmentation network according to an updated network parameter, to obtain a target segmentation network; call the first branch network to perform feature extraction on the first sample image, to determine a first sample predicted value associated with the target object; call the second branch network to perform feature extraction on the first sample mask image, to determine a second sample predicted value associated with the target object; determine a target sample predicted value associated with the target object based on the first sample predicted value and the second sample predicted value; and update a network parameter of the regression network according to the target sample predicted value and the target mark value, and iteratively train the regression network according to an updated network parameter, to obtain a target regression network; and obtain a target image processing model through the target segmentation network and the target regression network, the target image processing model being used for performing data analysis on the image to be processed including the target object, to obtain a target predicted value associated with the target object.

In this embodiment of this disclosure, the implementation of the processor 70 may be referred to in the description of relevant content in the embodiments corresponding to the accompanying drawings.

The computer device in this embodiment of this disclosure may obtain an image to be processed including a target object, perform image segmentation on the image to be processed, and determine a mask image associated with the target object; and perform feature extraction on the image to be processed, determine a first predicted value associated with the target object based on a feature extraction result of the image to be processed, perform feature extraction on the mask image, determine a second predicted value associated with the target object based on a feature extraction result of the mask image, and further determine a target predicted value associated with the target object according to the first predicted value and the second predicted value. The accuracy of the target predicted value can be increased in combination with the image segmentation technology.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

A person of ordinary skill in the art may understand that all or some of the processes of the methods in the embodiments may be implemented by a computer program instructing relevant hardware. The program may be stored in a computer-readable storage medium, such as a non-transitory computer-readable storage medium. During execution of the program, the procedures of the method embodiments are performed. The storage medium may include a magnetic disc, an optical disc, a read-only memory (ROM), a random access memory (RAM), or the like.

The descriptions are merely some embodiments of this disclosure, and are not intended to limit the scope of this disclosure. Other embodiments are within the scope of the present disclosure.

What is claimed is:

1. An image processing method, comprising:

obtaining an image including a target object;

performing image segmentation on the image;

determining a mask image of the target object based on the image segmentation performed on the image;

obtaining a first feature extraction result based on a first feature extraction on the image;

obtaining a first classification activation mapping graph based on a first classification activation mapping of the first feature extraction result;

determining a first predicted value associated with the target object based on the first classification activation mapping graph;

obtaining a second feature extraction result based on a second feature extraction on the mask image;

obtaining a second classification activation mapping graph based on a second classification activation mapping of the second feature extraction result;

determining a second predicted value associated with the target object based on the second classification activation mapping graph; and determining, by processing circuitry, a target predicted value associated with the target object according to the first predicted value and the second predicted value.

2. The method according to claim 1, wherein the image segmentation and the determination of the mask image are performed by a target segmentation network in a target image processing model, the target image processing model includes a target regression network, the target regression network includes a first branch network and a second branch network, the first feature extraction is performed by the first branch network, and the second feature extraction is performed by the second branch network.

3. The method according to claim 1, wherein the image segmentation and the determination of the mask image are performed by a target segmentation network in a target image processing model, the target image processing model further includes a target regression network, the target regression network is obtained based on a regression network that includes a first branch network and a second branch network, and the method further comprises:

obtaining a first sample image including a sample target object;

obtaining a target label of the first sample image, wherein the target label indicates a target mark value associated with the sample target object;

performing image segmentation on the first sample image through a segmentation network;

determining a first sample mask image of the sample target object based on the image segmentation performed on the first sample image;

performing a first feature extraction on the first sample image through the first branch network in the regression network;

determining a first sample predicted value associated with the sample target object based on a first sample feature extraction result of the first feature extraction performed on the first sample image;

performing a second feature extraction on the first sample mask image through the second branch network in the regression network;

determining a second sample predicted value associated with the sample target object based on a second sample feature extraction result of the second feature extraction performed on the first sample mask image;

determining a target sample predicted value associated with the sample target object based on the first sample predicted value and the second sample predicted value; and updating a network parameter of the regression network according to the target sample predicted value and the target mark value, and iteratively training the regression network according to the updated network parameter of the regression network, to obtain the target regression network.

4. The method according to claim 3, wherein the determining the first sample predicted value comprises:

performing classification activation mapping on the first sample feature extraction result of the first sample image, to obtain a first sample classification activation mapping graph, wherein the first sample classification activation mapping graph highlights an image area associated with the sample target object; and determining the first sample predicted value associated with the sample target object based on the first sample classification activation mapping graph.

5. The method according to claim 3, wherein the updating the network parameter of the regression network comprises:

obtaining a regression network loss function;

substituting the target sample predicted value and the target mark value to the regression network loss function, to obtain a loss value; and updating the network parameter of the regression network to reduce the loss value.

6. The method according to claim 4, wherein the segmentation network includes a feature extraction module, a pyramid sampling module, and an upsampling module, a feature map of the first sample image is extracted by the feature extraction module, the first feature extraction is performed on the feature map by the pyramid sampling module, to obtain a feature map set, the feature map set is upsampled by the upsampling module, and the determining the first sample mask image includes determining the first sample mask image of the sample target object based on the upsampled feature map set.

7. The method according to claim 4, wherein the second sample predicted value is determined based on a second sample classification activation mapping graph obtained by performing classification activation mapping on the second sample feature extraction result of the first sample mask image, and the method further comprises:

obtaining an average absolute value loss function;

calculating a value of the average absolute value loss function according to the first sample classification activation mapping graph and the second sample classification activation mapping graph; and updating network parameters of feature extraction modules in the first branch network and the second branch network to reduce the value of the average absolute value loss function.

8. The method according to claim 6, wherein the first feature extraction performed by the pyramid sampling module includes convolving the feature map by each dilated convolutional layer in the pyramid sampling module based on a corresponding dilated convolutional rate of the respective dilated convolutional layer, to obtain the feature map set.

9. The method according to claim 6, further comprising:

inputting the first sample classification activation mapping graph to the segmentation network, and obtaining a third sample feature extraction result of performing feature extraction on a feature map of a second sample image by the pyramid sampling module, wherein the second sample image is an image inputted to the segmentation network after the first sample image;

obtaining a segmentation network optimization function, and substituting the first sample classification activation mapping graph and the third sample feature extraction result to the segmentation network optimization function, to obtain a calculation result;

upsampling the calculation result by the upsampling module, and determining a second sample mask image associated with the sample target object based on the upsampled calculation result; and obtaining mask mark information of the second sample image, and iteratively updating a network parameter of the segmentation network and the segmentation network optimization function based on the second sample mask image and the mask mark information of the second sample image, to obtain the target segmentation network.

10. The method according to claim 9, wherein the sample target object is a spine, each pixel in the second sample mask image is classified as one of a background, a vertebra, or an intervertebral disc, the second sample mask image presents a background area, a vertebra area, and an intervertebral disc area in a differentiated manner, the mask mark information indicates a mark classification of each pixel in a mark mask image corresponding to the second sample image, and the mark classification of each pixel in the mark mask image is one of the background, the vertebra, or the intervertebral disc.

11. The method according to claim 9, wherein the iteratively updating the network parameter of the segmentation network and the segmentation network optimization function comprises:

calculating a value of a target loss function of the segmentation network based on the second sample mask image and the mask mark information of the second sample image; and updating the network parameter of the segmentation network to reduce the value of the target loss function.

12. A non-transitory computer-readable storage medium storing instructions which when executed by a processor cause the processor to perform the method according to claim 1.

13. An image processing method, comprising:

obtaining an image processing model including a segmentation network and a regression network, the regression network including a first branch network and a second branch network;

obtaining a first sample image including a sample target object and a target label of the first sample image, the target label indicating a target mark value associated with the sample target object;

performing image segmentation on the first sample image through the segmentation network;

determining a first sample mask image of the sample target object based on the image segmentation performed on the first sample image;

updating one or more network parameters of the segmentation network based on the first sample mask image, and iteratively training the segmentation network according to the updated one or more network parameters of the segmentation network, to obtain a target segmentation network;

obtaining a first sample feature extraction result based on a first feature extraction on the first sample image;

obtaining a first sample classification activation mapping graph based on a first classification activation mapping of the first sample feature extraction result;

determining, via the first branch network, a first sample predicted value associated with the sample target object based on the first sample classification activation mapping graph;

obtaining a second sample feature extraction result based on a second feature extraction on the first sample mask image;

obtaining a second sample classification activation mapping graph based on a second classification activation mapping of the second sample feature extraction result;

determining, via the second branch network, a second sample predicted value associated with the sample target object based on the second sample classification activation mapping graph;

determining a target sample predicted value associated with the sample target object based on the first sample predicted value and the second sample predicted value;

updating one or more network parameters of the regression network according to the target sample predicted value and the target mark value, and iteratively training the regression network according to the updated one or more network parameters of the regression network, to obtain a target regression network; and obtaining, by processing circuitry, a target image processing model through the target segmentation network and the target regression network, the target image processing model being configured to perform data analysis on an image including the sample target object, to obtain a target predicted value associated with the sample target object.

14. A non-transitory computer-readable storage medium storing instructions which when executed by a processor cause the processor to perform the method according to claim 13.

15. An image processing apparatus, comprising:

processing circuitry configured to:

obtain an image including a target object;

perform image segmentation on the image;

determine a mask image of the target object based on the image segmentation performed on the image;

obtain a first feature extraction result based on a first feature extraction on the image;

obtain a first classification activation mapping graph based on a first classification activation mapping of the first feature extraction result;

determine a first predicted value associated with the target object based on the first classification activation mapping graph;

obtain a second feature extraction result based on a second feature extraction on the mask image;

obtain a second classification activation mapping graph based on a second classification activation mapping of the second feature extraction result;

determine a second predicted value associated with the target object based on the second classification activation mapping graph; and determine a target predicted value associated with the target object according to the first predicted value and the second predicted value.

16. The image processing apparatus according to claim 15, wherein the image segmentation and the determination of the mask image are performed through a target segmentation network in a target image processing model, the target image processing model includes a target regression network, the target regression network includes a first branch network and a second branch network, the first feature extraction is performed by the first branch network, and the second feature extraction is performed by the second branch network.

17. The image processing apparatus according to claim 15, wherein the image segmentation and the determination of the mask image are performed through a target segmentation network in a target image processing model, the target image processing model further includes a target regression network, the target regression network is obtained based on a regression network that includes a first branch network and a second branch network; and the processing circuitry is configured to:

obtain a first sample image including a sample target object, and obtain a target label of the first sample image, wherein the target label indicates a target mark value associated with the sample target object;

perform image segmentation on the first sample image through a segmentation network, and determine a first sample mask image of the sample target object based on the image segmentation performed on the first sample image;

perform a first feature extraction on the first sample image through the first branch network in the regression network, and determine a first sample predicted value associated with the sample target object based on a first sample feature extraction result of the first feature extraction performed on the first sample image;

perform a second feature extraction on the first sample mask image through the second branch network in the regression network, and determine a second sample predicted value associated with the sample target object based on a second sample feature extraction result of the second feature extraction performed on the first sample mask image;

determine a target sample predicted value associated with the sample target object based on the first sample predicted value and the second sample predicted value; and update a network parameter of the regression network according to the target sample predicted value and the target mark value, and iteratively train the regression network according to the updated network parameter of the regression network, to obtain the target regression network.

* * * * *